United States Patent
Kawashima et al.

(10) Patent No.: US 7,558,827 B2
(45) Date of Patent: Jul. 7, 2009

(54) MAIL DISTRIBUTION SYSTEM, MAIL DISTRIBUTION METHOD, AND MAIL DISTRIBUTION PROGRAM

(75) Inventors: Masahisa Kawashima, Tokyo (JP); Jun Miyake, Kanagawa (JP); Tsuyoshi Abe, Musashino (JP); Katsumi Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 217 days.

(21) Appl. No.: 10/574,589

(22) PCT Filed: Oct. 14, 2004

(86) PCT No.: PCT/JP2004/015126

§ 371 (c)(1),
(2), (4) Date: Apr. 4, 2006

(87) PCT Pub. No.: WO2005/039130

PCT Pub. Date: Apr. 28, 2005

(65) Prior Publication Data

US 2007/0011245 A1    Jan. 11, 2007

(30) Foreign Application Priority Data

Oct. 17, 2003   (JP)   ............... 2003-358427

(51) Int. Cl.
G06F 15/16    (2006.01)
(52) U.S. Cl. ............... 709/206; 709/228; 709/245; 713/162
(58) Field of Classification Search ............ 709/206
See application file for complete search history.

(56) References Cited

U.S. PATENT DOCUMENTS 6,804,247 B1 * 10/2004 Sasyan et al. .......... 370/397

(Continued)

FOREIGN PATENT DOCUMENTS

EP     0 899 918 A2    3/1999

(Continued)

OTHER PUBLICATIONS

Aoki, Taida et al., 'Spam Slicer', a service for rooting up spam mails, http://internet.watch.impress.co.jp/www/article/2003/0613/spam. htm, 2003. (with partial English translation).

(Continued)

*Primary Examiner*—Patrice Winder
*Assistant Examiner*—Vivek Krishnan
(74) *Attorney, Agent, or Firm*—Oblon, Spivak, McClelland, Maier & Neustadt, P.C.

(57) ABSTRACT

When an alias mail having an alias address X as a destination is received from an originator terminal, an alias mail relay server restores a recipient address R and an alias address generation argument C, generates a reply destination address Y including the generation argument C restores and an originator address S, and replaces the destination and a transmission source with the recipient address R and Y to transfer the alias mail to a recipient terminal. On the other hand, when a reply mail is received from the recipient terminal, a remailer restored the originator address S and the generation argument C from Y, regenerates X from the generation argument C restored and the recipient address R, and replaces a destination and a transmission source with the originator address S and X to transfer the reply mail to the originator terminal.

15 Claims, 14 Drawing Sheets

U.S. PATENT DOCUMENTS

| | | | |
|---|---|---|---|
| 7,216,227 B2 * | 5/2007 | Grynberg | 713/162 |
| 7,231,427 B1 * | 6/2007 | Du | 709/206 |
| 2002/0087641 A1 * | 7/2002 | Levosky | 709/206 |
| 2002/0143710 A1 * | 10/2002 | Liu | 705/75 |
| 2003/0101283 A1 | 5/2003 | Lewis et al. | |
| 2005/0204011 A1 * | 9/2005 | Velayudham | 709/206 |

FOREIGN PATENT DOCUMENTS

| | | |
|---|---|---|
| EP | 1 059 779 A2 | 12/2000 |
| JP | 11-161574 | 6/1999 |
| JP | 2002-73475 | 3/2002 |
| JP | 2002-152246 | 5/2002 |
| JP | 2002-261837 | 9/2002 |
| JP | 2003-134166 | 5/2003 |
| JP | 2003-338849 | 11/2003 |

OTHER PUBLICATIONS

Gülcü, Ceki, et al.; "Mixing E-mail with Babel", 1996, pp. 2-16.

Gabber, Eran, et al.; "How to Make Personalized Web Browsing Simple, Secure and Anonymous", 1997, pp. 17-31.

* cited by examiner

ALIAS ADDRESS GENERATION PROCESSING (S201 IN FIG. 2)

USER ADDRESS RESTORATION PROCESSING (S203 IN FIG. 2)

REPLY DESTINATION ADDRESS GENERATION PROCESSING (S204 IN FIG. 2)

CONTROL INFORMATION UPDATE PROCESSING (S805 IN FIG. 8)

CONTROL INFORMATION UPDATE PROCESSING (S812 IN FIG. 8)

MAIL DISTRIBUTION SYSTEM, MAIL DISTRIBUTION METHOD, AND MAIL DISTRIBUTION PROGRAM

TECHNICAL FIELD

The present invention relates to a mail delivery system, a mail delivery method, and a mail delivery program for receiving an alias mail having an alias address different from a recipient address as a destination and replacing the destination with the recipient address to transfer the alias mail and receiving a reply mail responding to the alias mail and replacing the recipient address with an alias address as a transmission source of the reply mail to transfer the reply mail.

BACKGROUND ART

Conventionally, with an object of protection of privacy and prevention of illegal leakage of actual address, in the electronic mail communication, there is a mail delivery system that gives an alias address different from an actual address to a user and relays an alias mail addressed to an alias address to transfer the alias mail to the actual address. Specifically, in an alias mail relay server including a DB (database) in which alias addresses and actual addresses are associated with each other, when the alias mail relay server receives an alias mail having an alias address as a destination, the alias mail relay server acquires an actual address corresponding to the alias address with reference to the DB and replaces the destination of the alias mail with the actual address to transfer the alias mail to the actual address.

On the other hand, the alias mail relay server has problems explained below. For example, when a mailing list in which a user registers an alias address is a mailing list for delivering only a mail posted from the registered address (the alias address) to other users, a transmission source of an outgoing mail of the user is an actual address. As a result, the user cannot post the outgoing mail to the mailing list. When the user uses the alias address to conceal the actual address, if the user replies to an alias mail transferred from the alias mail relay server, a transmission source of the reply mail is the actual address. As a result, the user cannot return a mail.

Therefore, there is also a conventional technology for receiving a mail having an actual address as a transmission source address and replacing the actual address with an alias address as this transmission source to transfer the mail. For example, in a Patent Document 1 (Japanese Patent Application Laid-Open No. 2002-152246), in a transfer apparatus including a DB (database) in which alias addresses and actual addresses are associated with each other, when the transfer apparatus receives a mail having an actual address as a transmission source, the transfer apparatus acquires an alias address corresponding to the actual address with reference to the DB and replaces the actual address with the alias address as the transmission source of the mail to transfer the mail.

In addition to the conventional technology described above, there is also a mail delivery system that allows a user to freely generate a plurality of alias addresses and acquire an actual address without using a DB in which alias addresses and actual addresses are associated with each other (see, for example, a Nonpatent Literature 1). Specifically, the user freely generates a large number of alias addresses obtained by adding an arbitrary control character string (ToTanaka) after a character string (suzuki) for identifying the user such as suzuki.ToTanaka@isp-A.ne.jp and uses the alias addresses according to purposes. In an alias mail relay server, when an alias mail having an alias address as a destination is received, the alias mail relay server acquires an actual address from the character string (e.g., suzuki) for identifying the user in the alias address and replaces the destination of the alias mail with the actual address to transfer the alias mail.

Patent Document 1: Japanese Patent Application Laid-Open No. 2002-152246

Nonpatent Literature 1: Taiga Aoki, "'Spam Slicer', a service for rooting up spam mails, has been started in the United States", Oct. 15, 2003.

DISCLOSURE OF INVENTION

Problem to be Solved by the Invention

In the conventional technology described above (the conventional technology disclosed in the Patent Document 1), when the transfer apparatus receives a mail having an actual address as a transmission source and replaces the actual address with an alias address as this transmission source to transfer the mail, there are problems such as a burden of management of a database, delay of replacement processing, and inapplicability of the technology to a user having a plurality of alias addresses.

Specifically, in the conventional technology described above (the conventional technology disclosed in the Patent Document 1), it is necessary to prepare the DB (database) in which alias addresses and actual addresses are associated with each other and refer to this database in the replacement processing (processing for replacing an actual address with an alias address). Thus, there is a problem in that the replacement processing is delayed because of access to the database other than the problem in that the burden of management of the database occurs. In particular, in a situation in which alias address are infinitely generated, it is likely that resources of the database are infinitely required. Thus, the burden of management of the database and the delay of the replacement processing impose larger problems.

When the user has a plurality of alias addresses, for example, when the user freely generates a plurality of alias addresses (in the case of the conventional technology disclosed in the Nonpatent Literature 1), even if the DB in which the alias addresses and one actual address are associated with each other is prepared, it is impossible to uniquely select an appropriate alias address from the actual address. Therefore, even if the conventional technology (the conventional technology disclosed in the Patent Document 1) is used, it is impossible to replace a transmission source of a mail using the actual address as the transmission source with an appropriate alias address. Thus, there is also a problem in that it is impossible to apply the technology to the user having a plurality of alias addresses.

Thus, the present invention has been devised to solve the problems in the conventional technologies described above and it is an object of the present invention to provide a mail delivery system, a mail delivery method, and a mail delivery program that can replace, even when a transmission source of a mail having an actual address as the transmission source is replaced with an alias address to transfer the mail, the transmission source with the alias address without using a database and is capable of realizing a reduction in a burden of management of a database, an increase in speed of replacement processing, application of transfer processing to a user having a plurality of alias addresses, and the like.

Means for Solving Problem

It is an object of the present invention to at least solve the problems in the conventional technology.

According to an embodiment of the present invention, a mail delivery system is constructed such that it receives an alias mail having an alias address different from a recipient address as a destination and replaces the destination with the recipient address to transfer the alias mail and receives a reply mail responding to the alias mail and replaces the recipient address with the alias address as a transmission source of the reply mail to transfer the reply mail, wherein the mail delivery system includes: an alias mail processing unit that restores, when an alias mail having an alias address generated from the recipient address and a predetermined generation argument as a destination is received, the recipient address and the generation argument from the alias address, replaces the destination of the alias mail with the recipient address, and includes the generation argument in the alias mail to transfer to alias mail; and a reply mail processing unit that acquires, when a reply mail responding to the alias mail transferred by the alias mail processing unit is received, the generation argument from the reply mail, regenerates the alias address from the generation argument and a recipient address indicating a transmission source of the reply mail, and replaces the transmission source of the reply mail with the alias address to transfer the reply mail.

According to another embodiment of the present invention, the alias mail processing unit includes: a recipient address restoring unit that restores, when the alias mail is received, the recipient address and the generation argument from the alias address; a reply destination address generating unit that generates a reply destination address including the generation argument restored by the recipient address restoring unit and an originator address indicating a transmission source of the alias mail; and an alias mail transfer unit that replaces the destination of the alias mail with the recipient address restored by the recipient address restoring unit and replaces the transmission source of the alias mail with the reply destination address generated by the reply destination address generating unit to transfer the alias mail, and the reply mail processing unit includes: an originator address restoring unit that restores, when the reply mail is received, the originator address and the generation argument from the reply destination address that is a destination of the reply mail; an alias address regenerating unit that regenerates the alias address from the generation argument restored by the originator address restoring unit and the recipient address indicating the transmission source of the reply mail; and a reply mail transfer unit that replaces the destination of the reply mail with the originator address restored by the originator address restoring unit and replaces the transmission source of the reply mail with the alias address regenerated by the alias address regenerating unit to transfer the reply mail.

According to another embodiment of the present invention, the generation argument is information indicating transfer conditions that the alias mail transferred to the recipient should satisfy, the alias mail processing unit further includes a transfer possibility judging unit that judges whether the alias mail satisfies transfer conditions restored by the recipient address restoring unit, and the alias mail transfer unit transfers only an alias mail that is judged by the transfer possibility judging unit as satisfying the transfer conditions.

According to another embodiment of the present invention, the transfer conditions are transfer conditions that can be updated according to transfer of the alias mail, the alias mail processing unit further includes a transfer conditions updating unit that updates, when it is judged by the transfer possibility judging unit that the transfer conditions are satisfied, the transfer conditions to generate the generation argument anew, and the reply destination address generating unit generates a reply destination address including the generation argument generated anew by the transfer conditions updating unit instead of the generation argument restored by the recipient address restoring unit.

According to another embodiment of the present invention, the transfer conditions are transfer conditions that can be updated according to reception of the alias mail, the reply mail processing unit further includes a transfer conditions updating unit that updates the transfer conditions restored by the originator address restoring unit to generate the generation argument anew, and the alias address regenerating unit regenerates an alias address including the generation argument generated anew by the transfer condition updating unit instead of the generation argument restored by the originator address restoring unit.

According to another embodiment of the present invention, a mail transfer system that transfers a mail using a recipient alias address generated from a recipient address and a predetermined recipient generation argument and an originator alias address generated from an originator address and a predetermined originator generation argument, includes: a first mail processing unit that restores, when a mail having with a recipient reply destination address generated from the recipient alias address and the originator generation argument as a destination is received, the recipient alias address and the originator generation argument from the recipient reply destination address, regenerates the originator alias address from the originator generation argument and the originator address indicating a transmission source of the mail, and replaces the destination and the transmission source of the mail with the recipient alias address and the originator alias address to transfer the mail; a second mail processing unit that restores, when a mail having the recipient alias address and the originator alias address as a destination and a transmission source is received, the recipient address and the recipient generation argument from the recipient alias address, generates an originator reply destination address from the recipient generation argument and the originator alias address, and replaces the destination and the transmission source of the mail with the recipient address and the originator reply destination address to transfer the mail; a third mail processing unit that restores, when a reply mail having the originator reply destination address and the recipient address as a destination and a transmission source is received, the originator alias address and the recipient generation argument from the originator reply destination address, regenerates the recipient alias address from the recipient generation argument and the recipient address, and replaces the destination and the transmission source of the mail with the originator alias address and the recipient alias address to transfer the mail; and a fourth mail processing unit that restores, when a reply mail having the originator alias address and the recipient alias address as a destination and a transmission source is received, the originator address and the originator generation argument from the originator alias address, generates a recipient reply destination address from the originator generation argument and the recipient alias address, and replaces the destination and the transmission source of the mail with the originator address and the recipient reply destination address to transfer the mail.

According to another embodiment of the present invention, the recipient generation argument is information indicating transfer conditions that the mail transferred to the recipient should satisfy and the originator generation argument is information indicating transfer conditions that the mail transferred to the originator should satisfy, the second mail processing unit judges whether the mails satisfy transfer conditions related to the recipient generation argument restored from the recipient alias address and transfers only a mail that satisfies the transfer conditions, and the fourth mail processing unit judges whether the mails satisfy transfer conditions related to the originator generation argument restored from the originator alias address and transfers only a mail that satisfies the transfer conditions.

According to another embodiment of the present invention, a mail delivering method for receiving an alias mail having an alias address different from a recipient address as a destination and replacing the destination with the recipient address to transfer the alias mail, and for receiving a reply mail responding to the alias mail and replacing the recipient address with the alias address as a transmission source of the reply mail to transfer the reply mail includes: an alias mail processing step for restoring, when an alias mail having an alias address generated from the recipient address and a predetermined generation argument as a destination is received, the recipient address and the generation argument from the alias address, replacing the destination of the alias mail with the recipient address, and including the generation argument in the alias mail to transfer to alias mail; and a reply mail processing step for acquiring, when a reply mail responding to the alias mail transferred by the alias mail processing unit is received, the generation argument from the reply mail, regenerating the alias address from the generation argument and a recipient address indicating a transmission source of the reply mail, and replacing the transmission source of the reply mail with the alias address to transfer the reply mail.

According to another embodiment of the present invention, the alias mail processing step includes: a recipient address restoring step for restoring, when the alias mail is received, the recipient address and the generation argument from the alias address; a reply destination address generating step for generating a reply destination address including the generation argument restored by the recipient address restoring unit and an originator address indicating a transmission source of the alias mail; and an alias mail transferring step for replacing the destination of the alias mail with the recipient address restored by the recipient address restoring unit and replacing the transmission source of the alias mail with the reply destination address generated by the reply destination address generating step to transfer the alias mail, and the reply mail processing step includes: an originator address restoring step for restoring, when the reply mail is received, the originator address and the generation argument from the reply destination address that is a destination of the reply mail; an alias address regenerating step for regenerating the alias address from the generation argument restored by the originator address restoring step and the recipient address indicating the transmission source of the reply mail; and a reply mail transferring step for replacing the destination of the reply mail with the originator address restored by the originator address restoring step and replacing the transmission source of the reply mail with the alias address regenerated by the alias address regenerating step to transfer the reply mail.

According to another embodiment of the present invention, the generation argument is information indicating transfer conditions that the alias mail transferred to the recipient should satisfy, the alias mail processing step further includes a transfer possibility judging unit that judges whether the alias mail satisfies transfer conditions restored by the recipient address restoring step, and the alias mail transfer unit transfers only an alias mail that is judged by the transfer possibility judging step as satisfying the transfer conditions.

According to another embodiment of the present invention, a mail transferring method for transferring a mail using a recipient alias address generated from a recipient address and a predetermined recipient generation argument and an originator alias address generated from an originator address and a predetermined originator generation argument, the mail transfer method comprising: a first mail processing step for restoring, when a mail having with a recipient reply destination address generated from the recipient alias address and the originator generation argument as a destination is received, the recipient alias address and the originator generation argument from the recipient reply destination address, regenerating the originator alias address from the originator generation argument and the originator address indicating a transmission source of the mail, and replacing the destination and the transmission source of the mail with the recipient alias address and the originator alias address to transfer the mail; a second mail processing step for restoring, when a mail having the recipient alias address and the originator alias address as a destination and a transmission source is received, the recipient address and the recipient generation argument from the recipient alias address, generating an originator reply destination address from the recipient generation argument and the originator alias address, and replacing the destination and the transmission source of the mail with the recipient address and the originator reply destination address to transfer the mail; a third mail processing step for restoring, when a reply mail having the originator reply destination address and the recipient address as a destination and a transmission source is received, the originator alias address and the recipient generation argument from the originator reply destination address, regenerating the recipient alias address from the recipient generation argument and the recipient address, and replacing the destination and the transmission source of the mail with the originator alias address and the recipient alias address to transfer the mail; and a fourth mail processing step for restoring, when a reply mail having the originator alias address and the recipient alias address as a destination and a transmission source is received, the originator address and the originator generation argument from the originator alias address, generating a recipient reply destination address from the originator generation argument and the recipient alias address, and replacing the destination and the transmission source of the mail with the originator address and the recipient reply destination address to transfer the mail.

According to another embodiment of the present invention, the recipient generation argument is information indicating transfer conditions that the mail transferred to the recipient should satisfy and the originator generation argument is information indicating transfer conditions that the mail transferred to the originator should satisfy, the second mail processing step judges whether the mails satisfy transfer conditions related to the recipient generation argument restored from the recipient alias address and transfers only a mail that satisfies the transfer conditions, and the fourth mail processing step judges whether the mails satisfy transfer conditions related to the originator generation argument restored from the originator alias address and transfers only a mail that satisfies the transfer conditions.

According to another embodiment of the present invention, a mail delivering program that causes a computer to receive an alias mail having an alias address different from a recipient address as a destination and replace the destination with the recipient address to transfer the alias mail, and to receive a reply mail responding to the alias mail and replace the recipient address with the alias address as a transmission source of the reply mail to transfer the reply mail, the mail delivering program comprising: an alias mail processing procedure for restoring, when an alias mail having an alias address generated from the recipient address and a predetermined generation argument as a destination is received, the recipient address and the generation argument from the alias address, replacing the destination of the alias mail with the recipient address, and including the generation argument in the alias mail to transfer to alias mail; and a reply mail processing procedure for acquiring, when a reply mail responding to the alias mail transferred by the alias mail processing unit is received, the generation argument from the reply mail, regenerating the alias address from the generation argument and a recipient address indicating a transmission source of the reply mail, and replacing the transmission source of the reply mail with the alias address to transfer the reply mail.

According to another embodiment of the present invention, the alias mail processing procedure includes: a recipient address restoring procedure for restoring, when the alias mail is received, the recipient address and the generation argument from the alias address; a reply destination address generating procedure for generating a reply destination address including the generation argument restored by the recipient address restoring unit and an originator address indicating a transmission source of the alias mail; and an alias mail transferring procedure for replacing the destination of the alias mail with the recipient address restored by the recipient address restoring unit and replacing the transmission source of the alias mail with the reply destination address generated by the reply destination address generating procedure to transfer the alias mail, and the reply mail processing procedure includes: an originator address restoring procedure for restoring, when the reply mail is received, the originator address and the generation argument from the reply destination address that is a destination of the reply mail; an alias address regenerating procedure for regenerating the alias address from the generation argument restored by the originator address restoring procedure and the recipient address indicating the transmission source of the reply mail; and a reply mail transferring procedure for replacing the destination of the reply mail with the originator address restored by the originator address restoring unit and replacing the transmission source of the reply mail with the alias address regenerated by the alias address regenerating unit to transfer the reply mail.

According to another embodiment of the present invention, the generation argument is information indicating transfer conditions that the alias mail transferred to the recipient should satisfy, the alias mail processing procedure further includes a transfer possibility judging unit that judges whether the alias mail satisfies transfer conditions restored by the recipient address restoring unit, and the alias mail transferring procedure transfers only an alias mail that is judged by the transfer possibility judging unit as satisfying the transfer conditions.

According to another embodiment of the present invention, a mail transferring program that causes a computer to transfer a mail using a recipient alias address generated from a recipient address and a predetermined recipient generation argument and an originator alias address generated from an originator address and a predetermined originator generation argument, the mail transfer system comprising: a first mail processing procedure for restoring, when a mail having with a recipient reply destination address generated from the recipient alias address and the originator generation argument as a destination is received, the recipient alias address and the originator generation argument from the recipient reply destination address, regenerating the originator alias address from the originator generation argument and the originator address indicating a transmission source of the mail, and replacing the destination and the transmission source of the mail with the recipient alias address and the originator alias address to transfer the mail; a second mail processing procedure for restoring, when a mail having the recipient alias address and the originator alias address as a destination and a transmission source is received, the recipient address and the recipient generation argument from the recipient alias address, generating an originator reply destination address from the recipient generation argument and the originator alias address, and replacing the destination and the transmission source of the mail with the recipient address and the originator reply destination address to transfer the mail; a third mail processing procedure for restoring, when a reply mail having the originator reply destination address and the recipient address as a destination and a transmission source is received, the originator alias address and the recipient generation argument from the originator reply destination address, regenerating the recipient alias address from the recipient generation argument and the recipient address, and replacing the destination and the transmission source of the mail with the originator alias address and the recipient alias address to transfer the mail; and a fourth mail processing procedure for restoring, when a reply mail having the originator alias address and the recipient alias address as a destination and a transmission source is received, the originator address and the originator generation argument from the originator alias address, generating a recipient reply destination address from the originator generation argument and the recipient alias address, and replacing the destination and the transmission source of the mail with the originator address and the recipient reply destination address to transfer the mail.

According to another embodiment of the present invention, the recipient generation argument is information indicating transfer conditions that the mail transferred to the recipient should satisfy and the originator generation argument is information indicating transfer conditions that the mail transferred to the originator should satisfy, the second mail processing procedure judges whether the mails satisfy transfer conditions related to the recipient generation argument restored from the recipient alias address and transfers only a mail that satisfies the transfer conditions, and the fourth mail processing procedure judges whether the mails satisfy transfer conditions related to the originator generation argument restored from the originator alias address and transfers only a mail that satisfies the transfer conditions.

Effect of the Invention

According to the invention, in the processing for replacing a transmission source of a mail having an actual address as the transmission source with an alias address to transfer the mail, it is possible to replace the transmission source with the alias address without using a database. This makes it possible to realize a reduction in a burden of a burden of management of a database, an increase in speed of replacement processing, application of the transfer processing to a user having a plurality of alias addresses, and the like.

According to the invention, it is unnecessary to execute special processing in a terminal on a user side that receives an alias mail. A user is capable of including a generation argument necessary for regeneration of an alias address in a reply mail simply by executing usual mail return processing.

According to the invention, it is also possible to realize exclusion of a spam mail to a user. Moreover, since a database (a DB defining transfer conditions) is not used in judging possibility of transfer, it is also possible to increase speed of exclusion processing for a spam mail without causing a burden of management of a database.

According to the invention, since transfer conditions are updated according to the number of times of transfer, a transfer time, and the like, it is unnecessary to generate alias addresses many times. It is also possible to exclude a spam mail using an alias address generated once for a medium to long term.

According to the invention, since transfer conditions are updated according to the number of times of reply, a reply time, and the like, it is unnecessary to generate alias addresses many times. It is also possible to exclude a spam mail using an alias address generated once for a medium to long term.

According to the invention, even when both an originator and a recipient use alias addresses, in processing for replacing a transmission source of a mail having an actual address of the originator or the recipient as the transmission source with an alias address to transfer the mail, it is possible to replace the transmission source with the alias address without using a database. This makes it possible to realize a reduction in a burden of management of a database, an increase in speed of replacement processing, application of the processing to a user having a plurality of alias addresses.

According to the invention, it is also possible to realize exclusion of spam mails to both users (a recipient and an originator). Moreover, since a database (a DB defining transfer conditions) is not used in judging possibility of transfer, it is also possible to increase speed of exclusion processing for spam mails to both the users without causing a burden of management of a database.

EXPLANATIONS OF LETTERS OR NUMERALS

Figure 1:
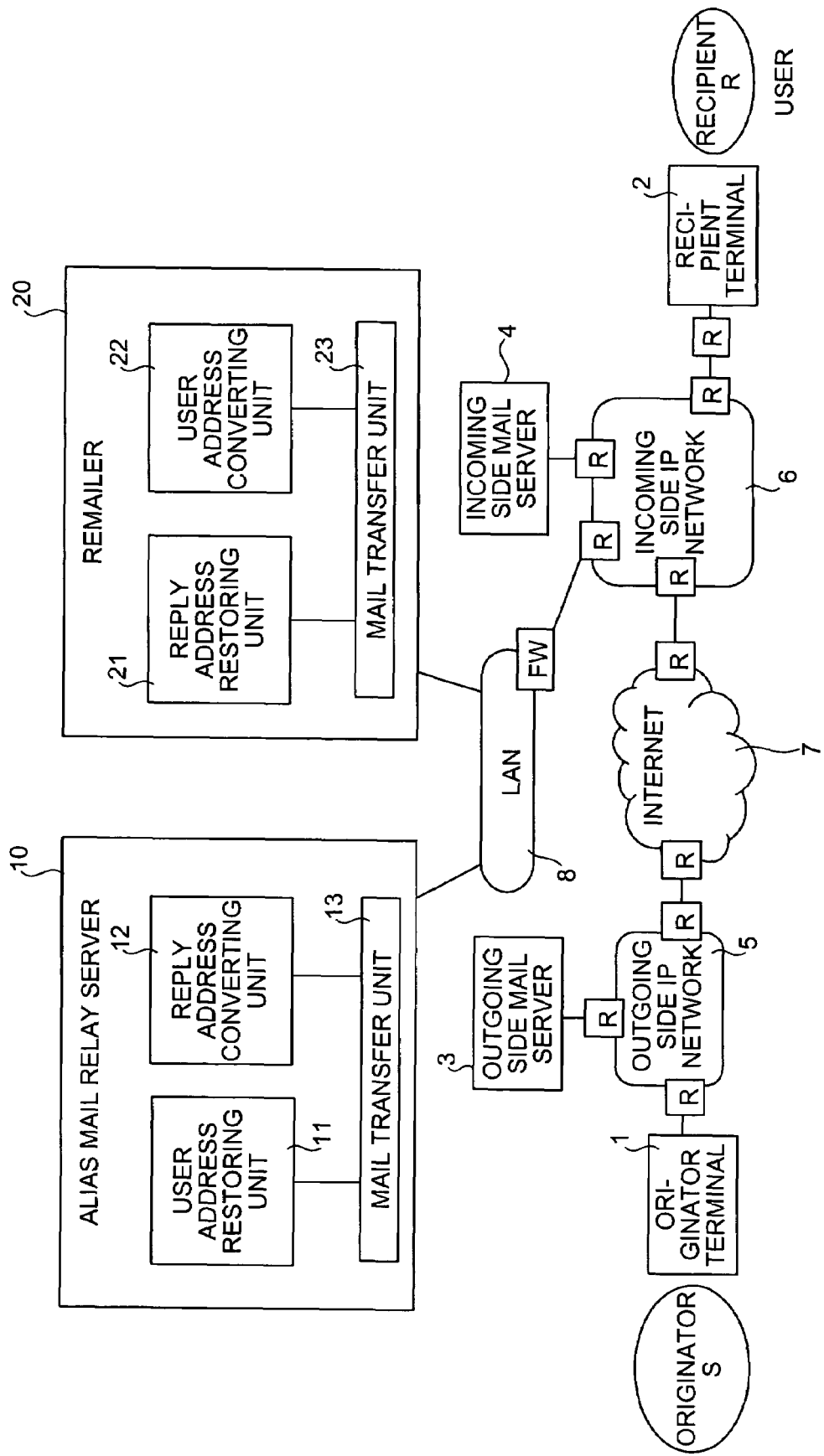
FIG. 1 is a system diagram of an overall constitution of a mail delivery system in a first embodiment.

1 Originator terminal
2 Recipient terminal
3 Outgoing side mail server
4 Incoming side mail server
5 Outgoing side IP network
6 Incoming side IP network
7 Internet
8 LAN
10 Alias mail relay server
11 User address restoring unit
12 Reply address converting unit
13 Mail transfer unit
20 Remailer
21 Reply address restoring unit
22 User address converting unit
23 Mail transfer unit

BEST MODE(S) FOR CARRYING OUT THE INVENTION

Embodiments of a mail delivery system, a mail delivery method, and a mail delivery program according to the present invention are explained in detail below with reference to the accompanying drawings. In the following explanation, main terms used in the embodiments and an outline and characteristics of the mail delivery system in the embodiments are explained and, then, various embodiments (first to fourth embodiments) are explained.

[Explanation of Terms]

First, main terms used in the embodiments are explained. A "recipient" used in the embodiments refers, in principle, to a person who receives an alias mail having an alias address described later as a destination. An "originator" used in the embodiments refers, in principle, to a person who transmits the alias mail. A mail address (an actual address) that the "recipient" originally has is referred to as a "recipient address R" in the embodiments. A mail address that the "originator" originally has is referred to as an "originator address S" in the embodiments.

An "alias address (represented as X(R,C) in the embodiments)" used in the embodiments refers, in principle, to a mail address different from the recipient address R held by the recipient. Specifically, an address generated from the recipient address R and an alias address generation argument C described later such as an address generated by combining a user name portion of the recipient address R and the alias address generation argument C corresponds to the mail address.

An "alias address generation argument (which corresponds to a "generation argument" described in the patent claims and is represented as C in the embodiments)" used in the embodiments refers to information to be used as an argument in generating the alias address. Specifically, an arbitrary character string (FromTanaka) shown in FIG. 3, control information described later, and the like correspond to the alias address generation argument.

Figure 10:
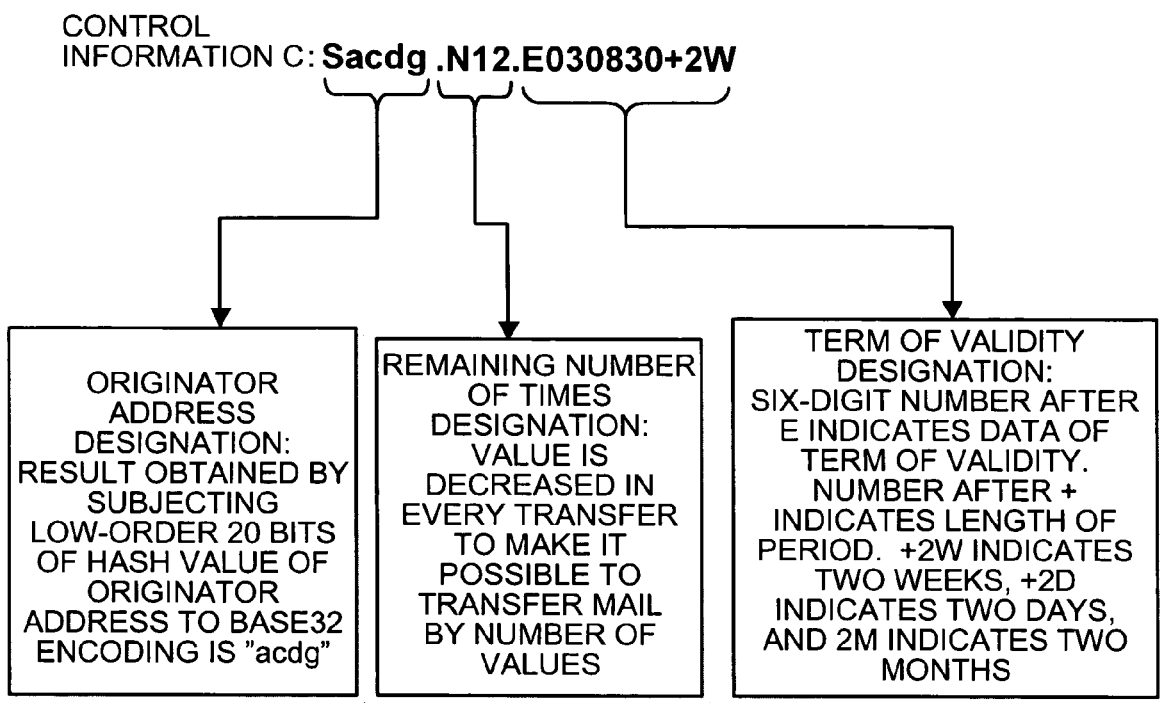
FIG. 10 is a diagram of an example of a structure of control information.

"Control information" used in the embodiments refers, in principle, to information indicting transfer conditions that should be satisfied by an alias mail transferred to a recipient. Specifically, as shown in FIG. 10, information including conditions related to transfer possibility judgment such as information generated from an originator address to which transfer is permitted, the number of times transfer is permitted, and a term of validity of permission corresponds to the control information. Since the "control information" is a kind of the "alias address generation argument" described above, the "control information" is represented as "control information C" using the identical sign as the "alias address generation argument C" in the second embodiment and the subsequent embodiments described later.

A "reply destination address (represented as Y(S,C) in this embodiment)" used in the embodiments refers, in principle, to a mail address that is a transmission source of an alias mail from the viewpoint of a recipient (a destination of a reply mail responding to the alias mail). Specifically, an address generated from the originator address S and the alias address generation argument C such as an address generated by combining a user name portion of the originator address S and the alias address generation argument C (a generation argument related to an alias address of the recipient) corresponds to the reply destination address.

[Outline and Characteristics]

Subsequently, an outline and characteristics of the mail delivery system in the embodiments are explained. Roughly, the mail delivery system in the embodiments receives, in the alias mail relay server, an alias mail having the alias address X(R,C) different from the recipient address R as a destination and replaces the destination with the recipient address R to transfer the alias mail and receives, in the remailer, a reply mail responding to the alias mail and replaces a transmission source of the reply mail with the alias address X(R,C) from the recipient address R to transfer the reply mail.

Such a mail delivery system has a main characteristic in that, even in transfer processing by the remailer, a transmission source is replaced with an alias address without using a database to make it possible to realize a reduction in a burden of management of a database, an increase in speed of replacement processing, application of the transfer processing to a user having a plurality of alias addresses, and the like. This main characteristic is briefly explained below.

In the mail delivery system in the embodiments, in the alias mail relay server, when an alias mail having the alias address X(R,C) is received from a communication terminal of an originator, the mail delivery system restores the recipient address R and the alias address generation argument C from the alias address X(R,C). Moreover, the mail delivery system generates the reply destination address Y(S,C) including the generation argument C restored and the originator address S that is the transmission source of the alias mail. The mail delivery system replaces the destination of the alias name with the recipient address R and replaces the transmission source of the alias mail with the reply destination address Y(S,C) to transfer the alias mail to a communication terminal of a recipient.

On the other hand, in the remailer, when a reply mail responding to the alias mail transferred by the alias mail relay server is received from the communication terminal of the recipient, the mail delivery system restores the originator address S and the generation argument C from the reply destination address Y(S,C) that is a destination of the reply mail. Moreover, the mail delivery system regenerates the alias address X(R,C) from the generation argument C restored and the recipient address R that is a transmission source of the reply mail. The mail delivery system replaces the destination of the reply mail with the originator address S and replaces the transmission source of the reply mail with the alias address X(R,C) to transfer the reply mail to the communication terminal of the originator.

As described above, according to the mail delivery system in the embodiments, in transfer processing by the remailer, rather than acquiring an alias address from a database in which alias addresses and recipient addresses are associated with each other, the mail delivery system regenerates an alias address from a reply mail itself. Thus, the mail delivery system can replace a transmission source of the reply mail with an alias address. This makes it possible to reduce a burden of management of a database and realize an increase in speed of replacement processing. In particular, even in a situation in which alias addresses are infinitely generated, it is unnecessary to take into account resources of the database at all and it is possible to smoothly execute replacement processing by the remailer.

According to the mail delivery system in the embodiments, rather than using an alias address associated with an actual address in a one-to-one relation, the mail delivery server uses an alias address generated from a recipient address and an alias address generation argument. Thus, it is also possible to apply the main delivery system to a user who uses a plurality of alias addresses according to purposes using different alias address generation arguments.

Moreover, according to the mail delivery system in the embodiments, since an alias address generation argument is included in a transmission source of an alias mail, it is unnecessary to execute special main return processing in a terminal on a recipient side. A recipient can include a generation argument necessary for regeneration of an alias address in a reply mail simply by executing usual mail return processing.

According to the mail delivery system in the embodiments, a database is also unnecessary in transfer by the alias mail relay server. It is possible to realize a reduction in a burden of management of a database and an increase in speed of replacement processing for replacing an alias address with an actual address in the same manner.

First Embodiment

In an explanation of a first embodiment, an alias address generated by combining a user name portion of the recipient address R and the alias address generation argument C, which is an arbitrary character string, is used. In the following explanation, a constitution of the main delivery system in the first embodiment is explained and, then, overall processing procedures, alias address generation processing, user address restoration processing, reply destination address generation processing, and reply address restoration processing are explained in order. Finally, effects and the like of the first embodiment are explained.

Constitution of a Mail Delivery System (First Embodiment)

First, a constitution of the mail delivery system in the first embodiment is explained with reference to FIG. 1. FIG. 1 is a system diagram of an overall constitution of the mail delivery system in the first embodiment.

As shown in the figure, the mail delivery system is constituted by connecting an originator terminal 1, a recipient terminal 2, an outgoing side mail server 3, an incoming side mail server 4, an alias mail relay server 10, and a remailer 20 to be capable of communicating with one another via a network (a communication network formed by an outgoing side IP network 5, an incoming side IP network 6, the Internet 7, a LAN 8, a router R, a firewall FW, and the like).

Among these devices, the originator terminal 1 and the recipient terminal 2 are known personal computers or work stations, game machines for home use, Internet TVs, PDAs, mobile communication terminals such as cellular phones or PHSs, or the like in which at least electronic mail software is installed. More specifically, the originator terminal 1 is a terminal that is used by an originator who transmits an alias mail to a recipient. The originator terminal also has a role of receiving a reply mail responding to the alias mail from the recipient. On the other hand, the recipient terminal 2 is a terminal that is used by the recipient who receives an alias mail transmitted from the originator. The recipient terminal 2 also has a role of transmitting a reply mail responding to the alias mail to the originator. Moreover, the recipient terminal 2 also performs processing for generating an alias address that is a destination of the alias mail. The processing for generating an alias address is described in detail later (see FIG. 3).

The outgoing side mail server 3 and the incoming side mail server 4 are so-called known mail servers. More specifically, the outgoing side mail server 3 has a role of receiving an alias mail from the originator terminal 1 and transmitting a reply mail responding to the alias mail to the originator terminal 1. The incoming side mail server 4 has a role of transmitting an alias mail to the recipient terminal 2 and receiving a reply mail responding to the alias mail from the recipient terminal 2.

The alias mail relay server 10 is a server that replaces a destination and a transmission source of an alias mail received from the originator terminal 1 (the outgoing side mail server 3) to transfer the alias mail to the recipient terminal 2 (the outgoing side mail server 4). The remailer 20 is a server that replaces a destination and a transmission source of a reply mail received from the recipient terminal 2 (the outgoing side mail server 4) to transfer the reply mail to the originator terminal 1 (the outgoing side mail server 3). Constitutions of the alias mail relay server 10 and the remailer 20 bearing main characteristics in the first embodiment are explained in detail below.

Constitution of the Alias Mail Relay Server (First Embodiment)

As shown in FIG. 1, the alias mail relay server 10 includes a user address restoring unit 11, a reply address converting unit 12, and a mail transfer unit 13.

Among the units, the user address restoring unit 11 is a unit that restores the recipient address R and the alias address generation argument C from the alias address X(R,C) that is a destination of an alias mail. User address restoration processing of the user address restoring unit 11 is described in detail later (see FIG. 4).

The reply address converting unit 12 is a unit that generates the reply destination address Y(S,C) from the originator address S, which is a transmission source of an alias mail, and the alias address generation argument C restored by the user address restoring unit 11. Reply destination address generation processing of the reply address converting unit 12 is described in detail later (see FIG. 5).

The mail transfer unit 13 is a unit that replaces a destination and a transmission source of an alias mail to transfer the alias mail to a recipient. Specifically, the mail transfer unit 13 replaces the destination of the alias mail with the recipient address R restored by the user address restoring unit 11 and replaces the transmission source of the alias mail with the reply destination address Y(S,C) generated by the reply address converting unit 12 to transfer the alias mail.

Constitution of the Remailer (First Embodiment)

As shown in FIG. 1, the remailer 20 includes a reply address restoring unit 21, a user address converting unit 22, and a mail transfer unit 23.

Among these units, the reply address restoring unit 21 is a unit that restores the originator address S and the alias address generation argument C from the reply destination address Y(S,C) that is a destination of a reply mail. An algorithm for restoration processing by the reply address restoring unit 21 and an algorithm for reply destination address generation processing by the reply address converting unit 12 have a relation of a pair of regular conversion and inverse conversion. The reply address restoration processing is described in detail later (see FIG. 6).

The user address converting unit 22 is a unit that regenerates the alias address X(R,C) from the recipient address R, which is a transmission source of a reply mail, and the alias address generation argument C restored by the reply address restoring unit 21. An algorithm of alias address regeneration processing by the user address converting unit 22 and an algorithm of restoration processing by the user address restoring unit 11 has a relation of a pair of regular conversion and inverse conversion. Details of the alias address regeneration processing are the same as those of alias address generation processing described in detail later with reference to FIG. 3.

The mail transfer unit 23 is a unit that replaces a destination and a transmission source of a reply mail to transfer the reply mail to an originator. Specifically, the mail transfer unit 23 replaces the destination of the reply mail with the originator address S restored by the reply address restoring unit 21 and replaces the transmission source of the reply mail with the alias address X(R,C) regenerated by the user address converting unit 22 to transfer the reply mail.

Processing Procedures in the First Embodiment

Figure 2:
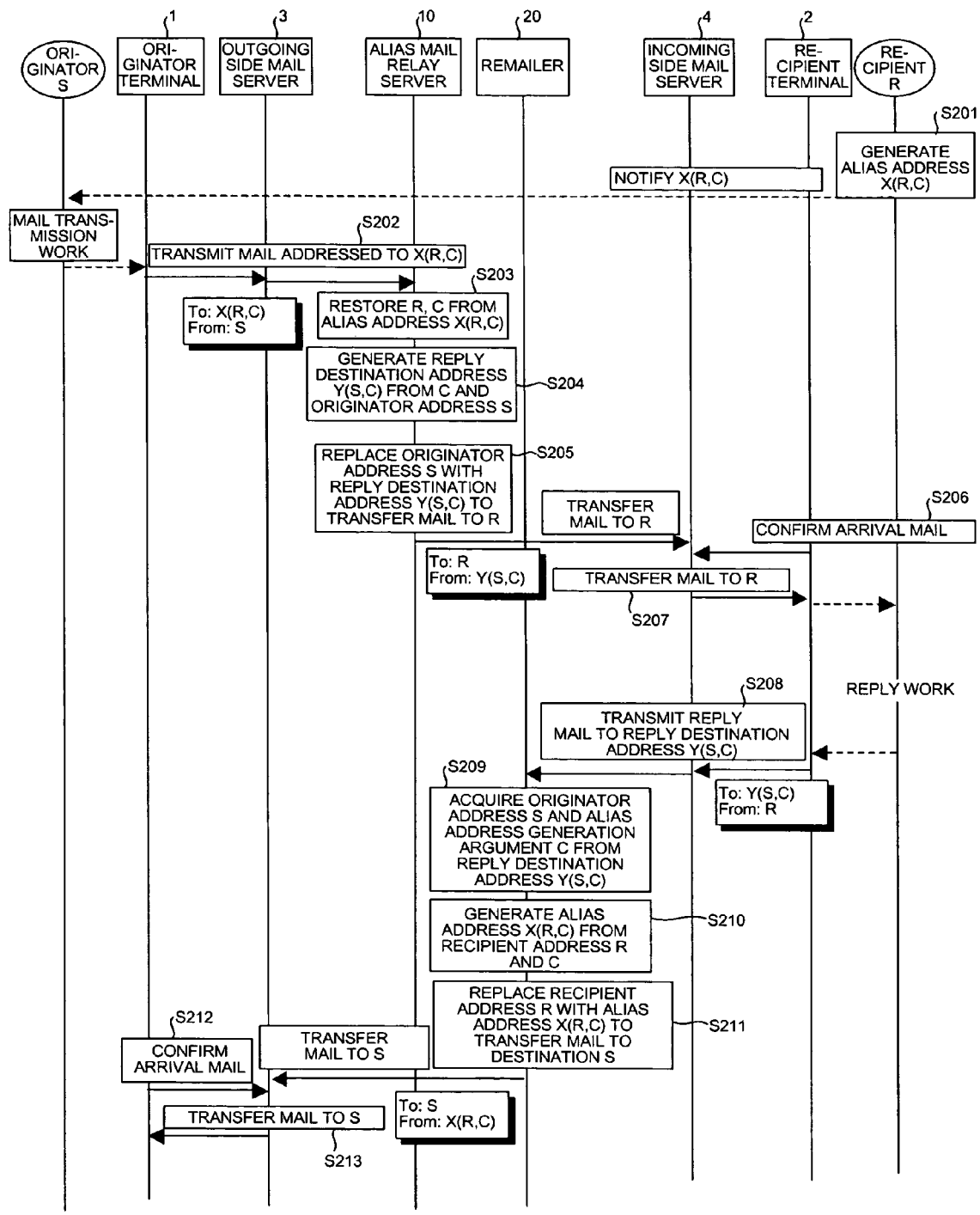
FIG. 2 is a sequence chart of a processing procedure in the first embodiment.

Processing procedures in the first embodiment are explained with reference to FIG. 2. FIG. 2 is a sequence chart of the processing procedure in the first embodiment.

As shown in the figure, the recipient terminal 2 receives the recipient address R and the alias address generation argument C from a recipient and generates the alias address X(R,C) (step S201). Consequently, the recipient receiving the issuance of the alias address X(R,C) operates the recipient terminal 2 or other not-shown terminals to communicate with an originator to notify the originator of the alias address X(R,C). Processing for generating an alias address by the recipient terminal 2 is described in detail later (see FIG. 3).

On the other hand, when the alias mail relay server 10 receives an alias mail from the originator terminal 1 via the outgoing side mail server 3 (step S202), the alias mail relay server 10 restores the recipient address R and the alias address generation argument C from the alias address X(R,C) that is a destination of the alias mail (step S203). User address restoration processing by the alias mail relay server 10 is described in detail later (see FIG. 4).

The alias mail relay server 10 generates the reply destination address Y(S,C) from the originator address S, which is a transmission source of the alias mail, and the alias address generation argument C restored at step S203 (step S204). Reply destination address generation processing by the alias mail relay server 10 is also described in detail later (see FIG. 5).

The alias mail relay server 10 replaces the destination of the alias mail with the recipient address R restored at step S203 and replaces the transmission source of the alias mail with the reply destination address Y(S,C) generated at step S204 to transfer the alias mail to the incoming side mail server 4 (step S205).

Subsequently, the incoming side mail server 4 receiving the alias mail from the alias mail relay server 10 temporarily stores the alias mail. When the incoming side mail server 4 receives an arrival mail confirmation request from the recipient terminal 2 (step S206), the incoming side mail server 4 transmits the alias mail temporarily stored to the recipient terminal 2 (step S207).

On the other hand, when the remailer 20 receives a reply mail responding to the alias mail from the recipient terminal 2 via the incoming side mail server 4 (step S208), the remailer 20 restores the originator address S and the alias address generation argument C from the reply destination address Y(S,C) that is a destination of the reply mail (step S209). Reply address restoration processing by the remailer 20 is described in detail later (see FIG. 6).

Moreover, the remailer 20 regenerates the alias address X(R,C) from the recipient address R, which is a transmission source of the reply mail, and the alias address generation argument C restored at step S209 (step S210). Details of alias address regeneration processing by the remailer 20 are the same as step S201.

The remailer 20 replaces the destination of the reply mail with the originator address S restored at step S209 and replaces the transmission source of the reply mail with the alias address X(R,C) regenerated at step S210 to transfer the reply mail to the outgoing side mail server 3 (step S211).

Subsequently, the outgoing side mail server 3 receiving the reply mail from the remailer 20 temporarily stores the reply mail. When the outgoing side mail server 3 receives an arrival mail confirmation request from the originator terminal 1 (step S212), the outgoing side mail server 3 transmits the reply mail temporarily stored to the originator terminal 1 (step S213). When the originator sends another reply mail in response to the reply mail, the processing at step S202 and the subsequent steps is repeated.

Alias Address Generation Processing (First Embodiment)

Figure 3:
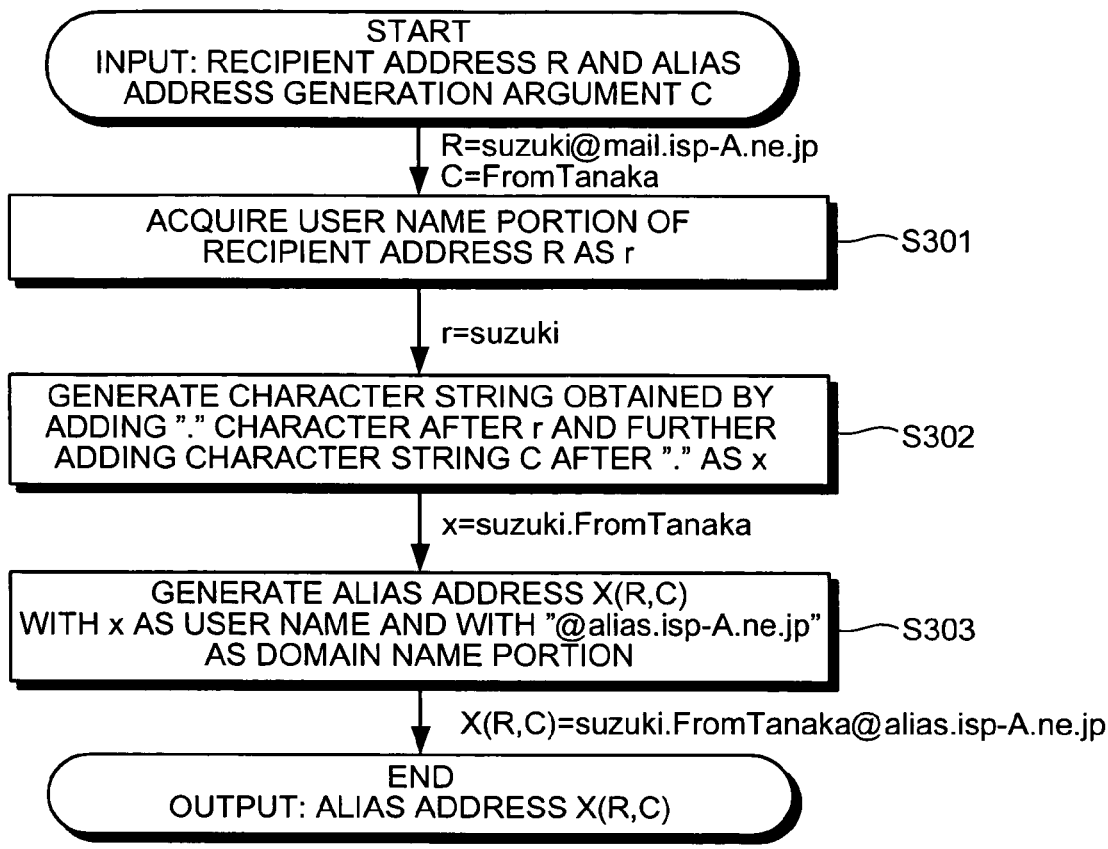
FIG. 3 is a flowchart of a flow of alias address generation processing in the first embodiment.

The alias address generation processing in the first embodiment (step S201 in FIG. 2) is explained with reference to FIG. 3. FIG. 3 is a flowchart of a flow of the alias address generation processing in the first embodiment.

As shown in the figure, when the recipient terminal 2 receives the recipient address R (=suzuki@mail.isp-A.ne.jp) and the alias address generation argument C (=FromTanaka) from the recipient via the operation unit, the recipient terminal 2 acquires a user name portion of the recipient address R as a character string r (=suzuki) (step S301I).

Moreover, the recipient terminal 2 acquires a character string obtained by adding "." after the user name portion r (=suzuki) of the recipient address R and adding the alias address generation argument C (=FromTanaka) after "." as x(=suzuki.FromTanaka) (step S302).

The recipient terminal 2 generates the alias address X(R,C) (=suzuki.FromTanaka@alias.isp-A.ne.jp) including the character string x(=suzuki.FromTanaka) as a user name portion and "@alias.isp-A.ne.jp" as a domain name portion (step S303). As a result, the recipient terminal 2 outputs the alias address X(R,C) (=suzuki.FromTanaka@alias.isp-A.ne.jp) from the display unit or the like.

In the example explained above, only the user name portion r of the recipient address R is included in an alias address. However, this is an example when domain names of recipient addresses of respective users are common. An alias address is not limited to this. When domain names are not common, a domain name may also be included in an alias address.

In the above explanation, an alias address is generated in the recipient terminal 2. However, it is not always necessary to generate an alias address in the recipient terminal 2. For example, it is also possible that an alias address generating server is provided on a network and the recipient terminal 2 accesses the alias address generating server to have an alias address issued.

User Address Restoration Processing (First Embodiment)

Figure 4:
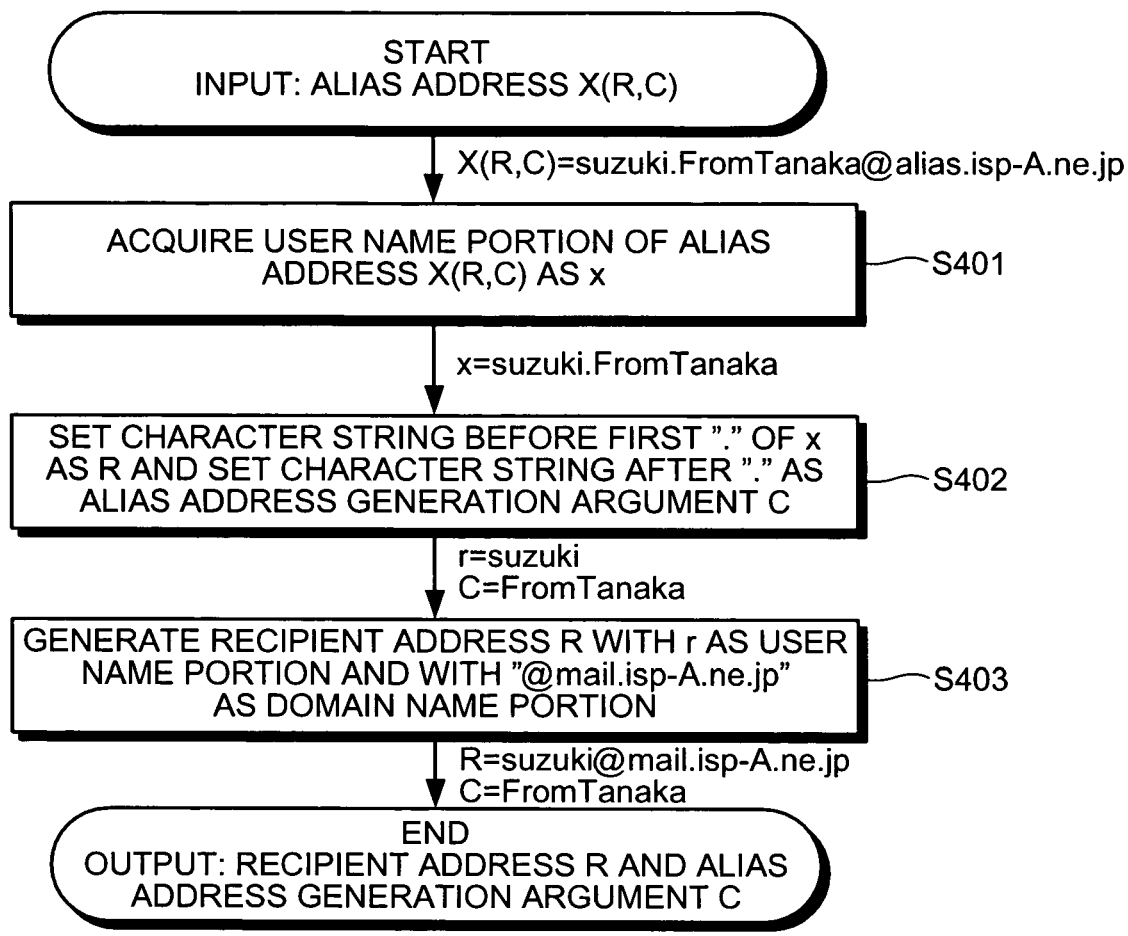
FIG. 4 is a flowchart of a flow of user address restoration processing in the first embodiment.

The user address restoration processing in the first embodiment (step S203 in FIG. 2) is explained with reference to FIG. 4. FIG. 4 is a flowchart of a flow of the user address restoration processing in the first embodiment.

As shown in the figure, when the alias address X(R,C) (=suzuki.FromTanaka@alias.isp-A.ne.jp), which is the destination of the alias mail, is inputted, the user address restoring unit 11 of the alias mail relay server 10 acquires a user name portion of the alias address X(R,C) as a character string x (=suzuki.FromTanaka) (step S401).

Moreover, the user address restoring unit 11 acquires a character string before "." of the user name portion x (=suzuki.FromTanaka) as r (=suzuki) and acquires a character string after "." as the alias address generation argument C (=FromTanaka) (step S402).

The user address restoring unit 11 generates the recipient address R (=suzuki@mail.isp-A.ne.jp) with the character string r (=suzuki) as a user name portion and "@mail.isp-A.ne.jp" as a domain name portion (step S403). As a result, the user address restoring unit 11 outputs the recipient address R (=suzuki@mail.isp-A.ne.jp) and the alias address generation argument C (=FromTanaka).

In the above explanation, an alias address is generated with the domain name of the recipient address R excluded. However, an alias address is not always limited to this. When an alias address is generated including the domain name of the recipient address R, the alias address is restored with the domain name included therein, it is unnecessary to add a domain name again.

Reply Destination Address Generation Processing (First Embodiment)

Figure 5:
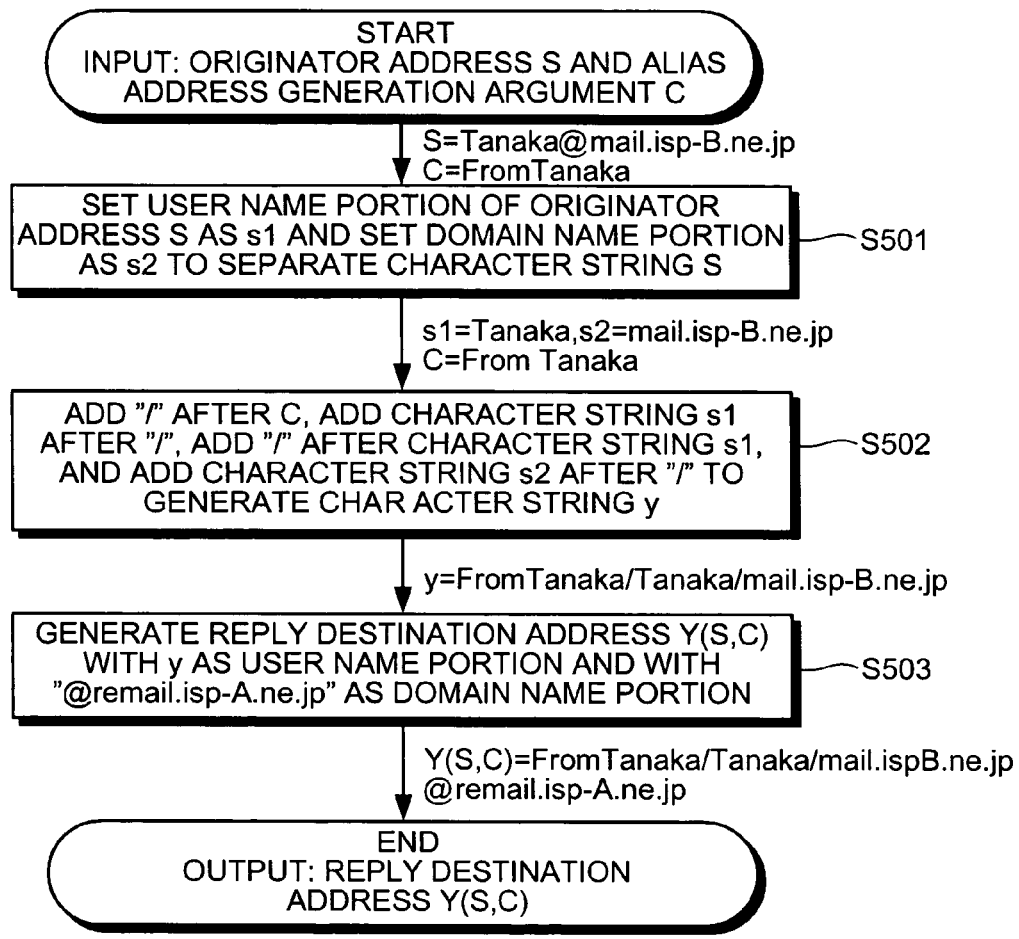
FIG. 5 is a flowchart of a flow of reply destination address generation processing in the first embodiment.

The reply destination address generation processing in the first embodiment (step S204 in FIG. 2) is explained with reference to FIG. 5. FIG. 5 is a flowchart of a flow of the reply destination address generation processing in the first embodiment.

As shown in the figure, when the originator address S (=Tanaka@mail.isp-B.ne.jp) and the alias address generation argument C (=FromTanaka) are inputted, the reply address converting unit 12 of the alias mail relay server 10 sets a user name portion of the originator address S as s1 (=Tanaka) and sets a domain name portion as s2 (=mail.isp-B.ne.jp) to separate the originator address S (step S501).

The reply address converting unit 12 adds "/" after the alias address generation argument C (=FromTanaka), adds a character string s1 (=Tanaka) after "/", adds "/" after the character string s1, and further adds a character string s2 (=mail.isp-B.ne.jp) after "/" to generate a character string y (=FromTanaka/Tanaka/mail.isp-B.ne.jp) (step S502).

The reply address converting unit 12 generates a reply destination address Y(S,C) (=FromTanaka/Tanaka/remail-.isp-B.ne.jp) with the character string y (=FromTanaka/Tanaka/mail.isp-B.ne.jp) as a user name portion and "@remail.isp.-A.ne.jp" as a domain name (step S503). As a result, the reply address converting unit 12 outputs the reply destination address Y(S,C).

Reply Address Restoration Processing (First Embodiment)

Figure 6:
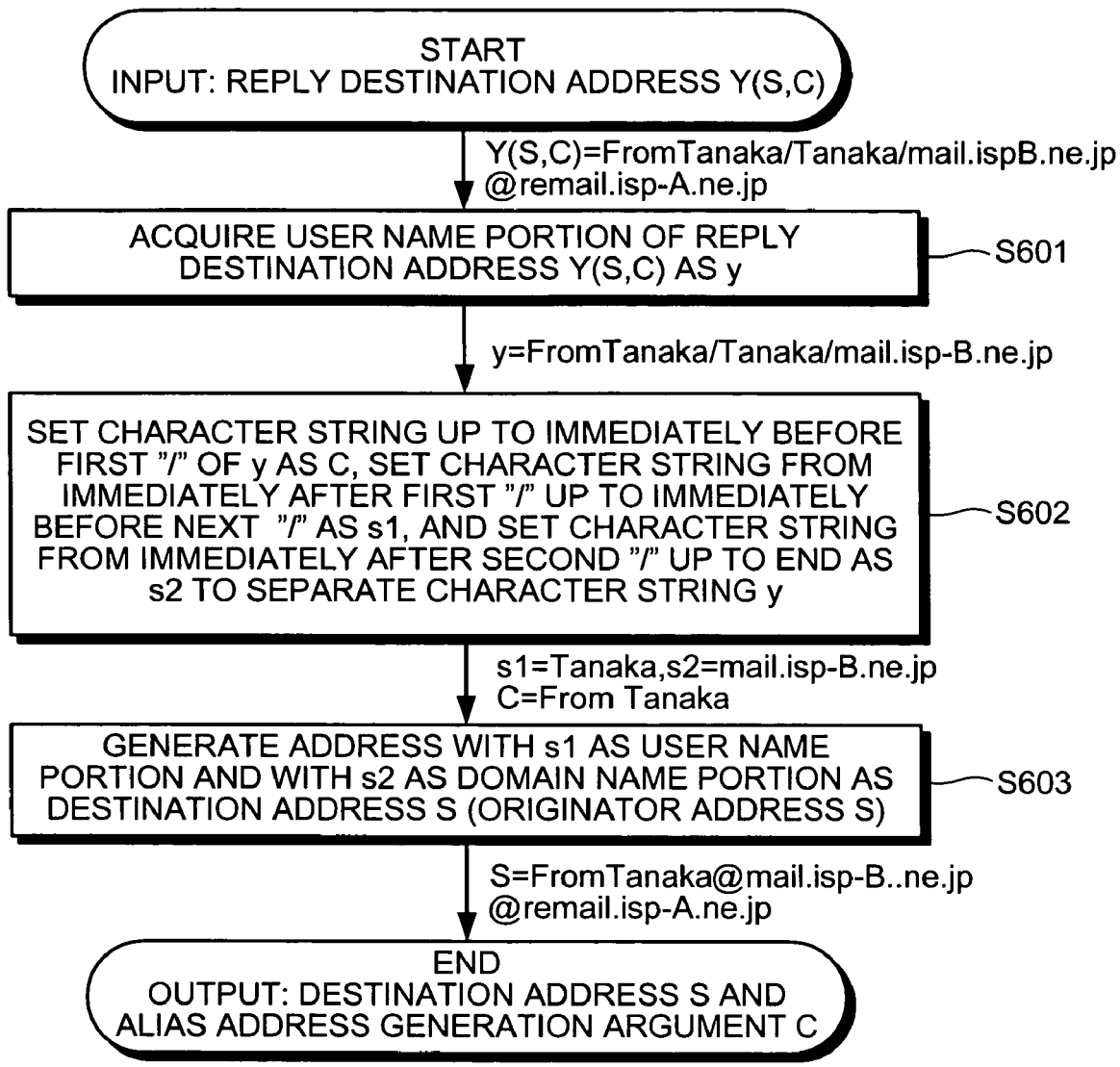
FIG. 6 is a flowchart of a flow of reply address restoration processing in the first embodiment.

The reply address restoration processing in the first embodiment (step S209 in FIG. 2) will be explained with reference to FIG. 6. FIG. 6 is a flowchart of a flow of the reply address restoration processing in the first embodiment.

As shown in the figure, when the reply destination address Y(S,C) (=FromTanaka/Tanaka/mail.isp-B.ne.jp@remail.isp-A.ne.jp) is inputted, the reply address restoring unit 21 of the remailer 20 acquires a user name portion of the reply destination address Y as a character string y (=FromTanaka/Tanaka/mail.isp-B.ne.jp) (step S601).

Moreover, the reply address restoring unit 21 sets a character string up to immediately before the first "/" of the character string y (=FromTanaka/Tanaka/mail.isp-B.ne.jp) as the alias address generation argument C (=FromTanaka), sets a character string from immediately after the "/" up to immediately before the next "/" as s1 (=Tanaka), and further sets a character string from immediately after the "/" up to the end as s2 (=mail.isp-B.ne.jp) to separate the character string y (step S602).

The reply address restoring unit 21 sets the character string s1 (=Tanaka) as a user name portion and sets the character string s2 (=mail.isp-B.ne.jp) as a domain name portion to generate the originator address S (=Tanaka@mail.isp-B.ne.jp) that is the destination address S (step S603). As a result, the reply address restoring unit 21 outputs the destination address S (=Tanaka@mail.isp-B.ne.jp) and the alias address generation argument C (=FromTanaka).

Effects and the Like of the First Embodiment

As described above, according to the first embodiment, in the transfer processing by the remailer 20, it is possible to replace a transmission source with an alias address without using a database. This makes it possible to realize a reduction in a burden of management of a database and an increase in speed of replacement processing and realize application of the transfer processing to a user having a plurality of alias addresses.

Moreover, according to the first embodiment, since the alias address generation argument C is included in the reply destination address Y(S,C), it is unnecessary to execute special processing in the recipient terminal 2. A recipient can include the alias address generation argument C necessary for regeneration of an alias address in a reply mail simply by executing usual mail return processing.

Second Embodiment

In an explanation of a second embodiment, an alias address generated by using the control information C (information indicating transfer conditions that should be satisfied by an alias mail transferred to a recipient) as the alias address generation argument C is used to perform judgment on possibility of transfer based on the control information C and the control information C is automatically updated. In the following explanation, a constitution of a mail delivery system in the second embodiment is explained and, then, overall processing procedures, alias address generation processing, user address restoration processing, transfer possibility judgment processing, and control information update processing are explained in order. Finally, effects and the like of the second embodiment are explained.

Constitution of a Mail Delivery System (Second Embodiment)

Figure 7:
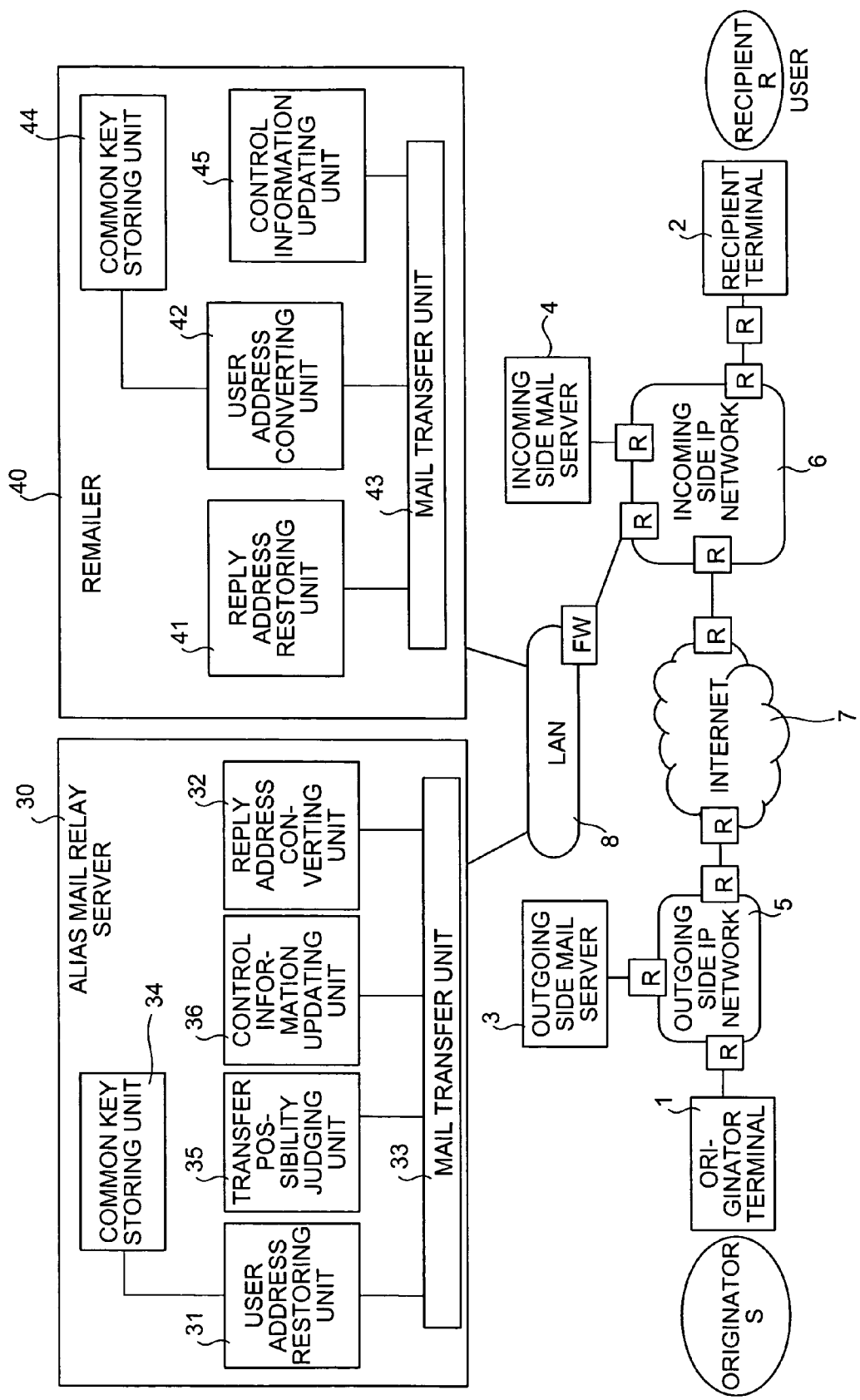
FIG. 7 is a system diagram showing an overall constitution of a mail delivery system in a second embodiment.

First, a constitution of a mail delivery system in the second embodiment is explained with reference to FIG. 7. FIG. 7 is a system diagram of an overall constitution of the mail delivery system in the second embodiment.

As shown in the figure, the mail delivery system is constituted by connecting the originator terminal 1, the recipient terminal 2, the outgoing side mail server 3, the incoming side mail server 4, an alias mail relay server 30, and a remailer 40 to be capable of communicating with one another via the network (the communication network formed by the outgoing side IP network 5, the incoming side IP network 6, the Internet 7, the LAN 8, the router R, the firewall FW, and the like).

Among these devices, the originator terminal 1, the recipient terminal 2, the outgoing side mail server 3, and the incoming side mail server 4 are the same as the devices explained by affixing the identical reference numerals in the first embodiment. However, processing for generating an alias address by the recipient terminal 2 is different from that in the first embodiment and is described in detail later (see FIGS. 9 and 10).

The alias mail relay server 30 and the remailer 40 are basically the same as the alias mail relay server 10 and the remailer 20. Constitutions of the alias mail relay server 30 and the remailer 40 are explained in detail below.

Alias Mail Relay Server (Second Embodiment)

As shown in FIG. 7, the alias mail relay server 30 includes a user address restoring unit 31, a reply address converting unit 32, a mail transfer unit 33, a common key storing unit 34, a transfer possibility judging unit 35, and a control information updating unit 36.

Among these units, the user address restoring unit 31, the reply address converting unit 32, and the mail transfer unit 33 are basically the same as the user address restoring unit 11, the reply address converting unit 12, and the mail transfer unit 13 explained in the first embodiment. However, the reply address converting unit 32 and the mail transfer unit 33 execute processing only when the transfer possibility judging unit 35 described later judges that transfer is possible.

In restoring the control information C, the user address restoring unit 11 also performs processing for judging correctness of the alias address X(R,C) and outputting validity or invalidity of the alias address X(R,C). Processing for user address restoration by the user address restoring unit 11 is described in detail later (see FIG. 11).

The common key storing unit 34 is a unit that stores a common key same as the common key used for alias address generation by the recipient terminal 2. Specifically, this common key is used when a comparison code compared with a tamper prevention code of the alias address generation argument C (the control information C) is generated in the user address restoring unit 11.

The transfer possibility judging unit 35 is a unit that judges whether an alias mail satisfies the control information C (information indicating transfer conditions that should be satisfied by an alias mail transferred to a recipient) restored by the user address restoring unit 31. Processing for transfer possibility judgment by the transfer possibility judging unit 35 is described in detail later (see FIG. 12).

The control information updating unit 36 is a unit that updates the control information C (i.e., the transfer conditions) restored by the user address restoring unit 31 to generate new control information C1. The reply address converting unit 32 generates a reply destination address including the control information C1 generated anew by the control information updating unit 36 instead of the control information C restored by the user address restoring unit 31. Processing for control information update by the control information updating unit 36 is described in detail later (see FIG. 13).

Constitution of the Remailer (Second Embodiment)

As shown in FIG. 7, the remailer 40 includes a reply address restoring unit 41, a user address converting unit 42, a mail transfer unit 43, a common key storing unit 44, and a control information updating unit 45.

Among these units, the reply address restoring unit 41, the user address converting unit 42, and the mail transfer unit 43 are basically the same as the reply address restoring unit 21, the user address converting unit 22, and the mail transfer unit 23 explained in the first embodiment.

Like the alias mail relay server 30 and the common key storing unit 34, the common key storing unit 44 is a unit that stores a common key same as the common key used for alias address generation by the recipient terminal 2. Specifically, this common key is used in generating a tamper prevention code of the alias address generation argument C (the control information C) in the user address converting unit 42.

The control information updating unit 45 is a unit that updates the control information C1 (i.e., the transfer conditions) restored by the reply address restoring unit 41 to generate new control information C2. The user address converting unit 42 generates an alias address including the control information C2 generated anew by the control information updating unit 45 instead of the control information C1 restored by the reply address restoring unit 41. Processing for control information update by the control information updating unit 45 is explained in detail later (see FIG. 14).

Processing Procedures in the Second Embodiment

Figure 8:
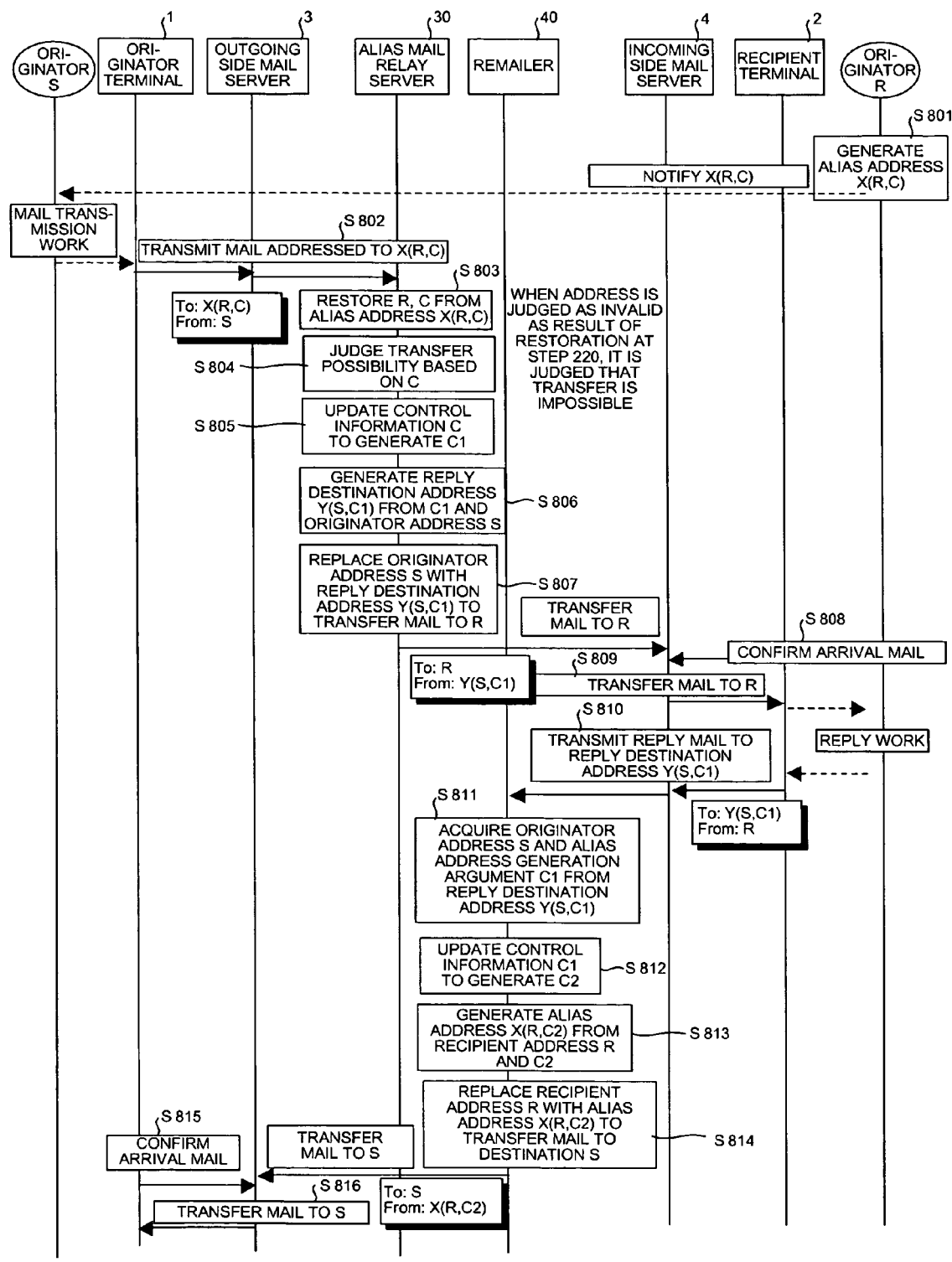
FIG. 8 is a sequence chart of a processing procedure in the second embodiment.

Processing procedures in the second embodiment is explained with reference to FIG. 8. FIG. 8 is a sequence chart of the processing procedures in the second embodiment.

As shown in the figure, the recipient terminal 2 receives the recipient address R and the control information C (more specifically, transfer conditions such as originator address designation, remaining number of times designation, and term of validity designation) from a recipient and generates the alias address X(R,C) (step S801). Consequently, the recipient receiving the issuance of the alias address X(R,C) operates the recipient terminal 2 and not-shown other terminals to communicate with an originator and notifies the originator of the alias address X(R,C). Processing for generating an alias address by the recipient terminal 2 is described in detail later (see FIGS. 9 and 10).

On the other hand, when the alias mail relay server 30 receives an alias mail from the originator terminal 1 via the outgoing side mail server 3 (step S802), the alias mail relay server 30 restores the recipient address R and the control information C from the alias address X(R,C) that is a destination of the alias mail (step S803). In restoration processing by the alias mail relay server 30, the alias mail relay server 30 judges correctness of the alias address X(R,C) and outputs validity or invalidity of the alias address X(R,C). When it is judged that the alias address X(R,C) is invalid, transfer of the alias mail is rejected. User address restoration processing by the alias mail relay server 30 is described in detail later (see FIG. 11).

Moreover, the alias mail relay server 30 performs transfer possibility judgment for judging whether the alias mail satisfies the control information C (the transfer conditions) restored at step S803 (step S804). When it is judged in the transfer possibility judgment that transfer is impossible, transfer of the alias mail is also rejected. Transfer possibility judgment processing by the alias mail relay server 30 is described in detail later (see FIG. 12).

When it is judged at step S804 that transfer is possible, the alias mail relay server 30 updates the control information C (the transfer conditions) restored at step S803 to generate new control information C1 (step S805). Processing for control information update by the alias mail relay server 30 is described in detail later (see FIG. 13).

Moreover, the alias mail relay server 30 generate a reply destination address Y(S,C1) from the originator address S, which is a transmission source of the alias mail, and the control information C1 generated anew at step S805 (step S806). Details of reply destination address generation processing by the alias mail relay server 30 are basically the same as the processing explained in the first embodiment with reference to FIG. 5.

The alias mail relay server 30 replaces the destination of the alias mail with the recipient address R restored at step S803 and replaces the transmission source of the alias mail with the reply destination address Y(S,C1) generated at step S806 to transfer the alias mail to the incoming side mail server 4 (step S807).

Subsequently, the incoming side mail server 4 receiving the alias mail from the alias mail relay server 30 temporarily stores the alias mail. When the incoming side mail server 4 receives an arrival mail confirmation request from the recipient terminal 2 (step S808), the incoming side mail server 4 transmits the alias mail temporarily stored to the recipient terminal 2 (step S809).

On the other hand, when the remailer 40 receives a reply mail responding to the alias mail from the recipient terminal 2 via the incoming side mail server 4 (step S810), the remailer 40 restores the originator address S and the control information C1 from the reply destination address Y(S,C1) that is a destination of the reply mail (step S811). Details of reply address restoration processing by the remailer 40 are basically the same as the processing explained in the first embodiment with reference to FIG. 6.

The remailer 40 updates the control information C1 (the transfer conditions) restored at step S811 to generate new control information C2 (step S812). Processing for control information update by the remailer 40 is described in detail later (see FIG. 14).

Moreover, the remailer 40 regenerates alias address X(R, C2) from the recipient address R, which is a transmission source of the reply mail, and the control information C2 generated anew at step S812 (step S813). Details of alias address regeneration processing by the remailer 40 are basically the same as step S801.

The remailer 40 replaces the destination of the reply mail with the originator address S restored at step S811 and replaces the transmission source of the reply mail with the alias address X(R,C2) regenerated at step S813 to transfer the reply mail to the outgoing side mail server 3 (step S814).

Subsequently, the outgoing side mail server 3 receiving the reply mail from the remailer 40 temporarily stores the reply mail. When the outgoing side mail server 3 receives an arrival mail confirmation request from the originator terminal 1 (step S815), the outgoing side mail server 3 transmits the reply mail temporarily stored to the originator terminal 1 (step S816). When the originator sends another reply mail in response to the reply mail, the processing at step S802 and the subsequent steps is repeated.

Alias Address Generation Processing (Second Embodiment)

Figure 9:
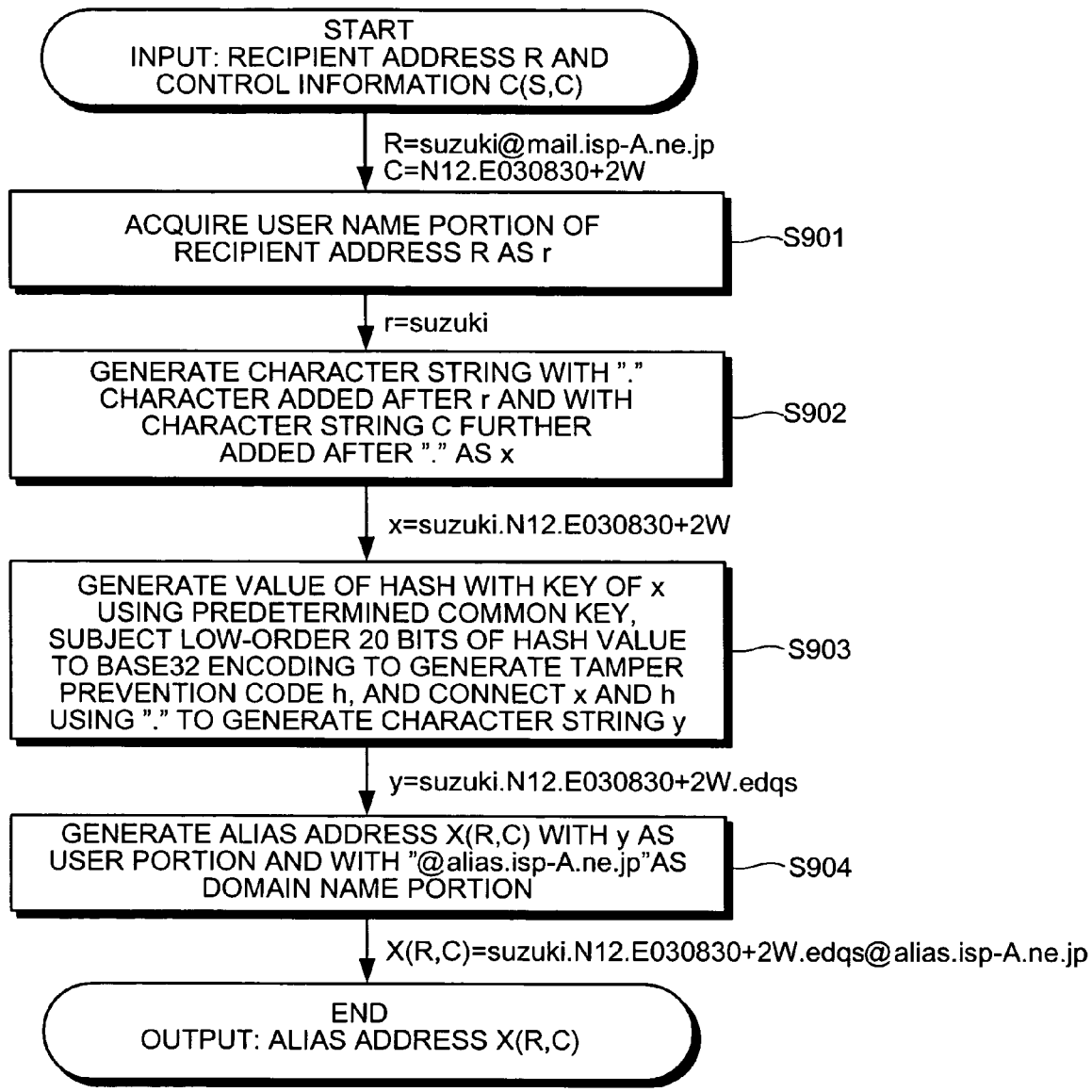
FIG. 9 is a flowchart of a flow of alias address generation processing in the second embodiment.

The alias address generation processing in the second embodiment (step S801 in FIG. 8) is explained with reference to FIG. 9. FIG. 9 is a flowchart of a flow of the alias address generation processing in the second embodiment.

However, in FIG. 9, assuming that transfer conditions that an alias mail should satisfy are already received from a recipient via the operation unit to generate the control information C, first, generation of the control information C is briefly explained. FIG. 10 is a diagram of an example of a structure of control information. As shown in the figure, the control information C is generated by combining the transfer conditions (transfer conditions such as originator address designation, remaining number of times designation, and term of validity designation) received from the recipient via the operation unit.

The "originator address designation" is a condition for designating an originator. Specifically, the "originator address designation" is represented by combining a transfer condition identifier "S" of the "originator address designation" and a value (e.g., "acdg") obtained by subjecting low-order 20 bits of a hash value of the originator address S received from the recipient to BASE32 encoding.

The "remaining number of times designation" is a condition for designating the number of times of transfer. Specifically, the "remaining number of times" is represented by combining a transfer condition identifier "N" of the "remaining number of times designation" and a value (e.g., "21") to be decreased in every transfer.

The "term of validity designation" is a condition for designating a term of validity of an alias address. Specifically, the "term of validity designation" is represented by combining a transfer condition identifier "E" of the "term of validity designation", a value (e.g., "030830") indicating year, month, and day of a term of validity, and a value (e.g., "+2W") indicting an update period unit of the term of validity.

Returning to the explanation of FIG. 9, when the recipient terminal 2 receives the recipient address R (=suzuki@mail.isp-A.ne.jp) and the control information C (=N12.E030830+2W) from the recipient via the operation unit, the recipient terminal 2 acquires a user name portion of the recipient address R as a character string r (=suzuki) (step S901).

Moreover, the recipient terminal 2 acquires a character string obtained by adding "." after the user name portion r (=suzuki) of the recipient address R and adding the control information C (=N12.E030830+2W) after "." as x (=suzuki.N12.E030830+2W) (step S902).

The recipient terminal 2 generates a hash value of the character string x using a predetermined common key (a key commonly held by the alias mail relay server 30 and the remailer 40). After generating a tamper prevention code h (=edqs) by subjecting low-order 20 bits of the hash value to BASE32 encoding, the recipient terminal 2 connects the character string X and the tamper prevention code h using "." to generate a character string y (suzuki.N12.E030830+ 2W.edqs) (step S903).

The recipient terminal 2 generates the alias address X(R,C) (=suzuki.N12.E030830+2W.edqs@alias.isp-A.ne.jp) with the character string y (suzuki.N12.E030830+2W.edqs) as a user name portion and with "@alias.isp-A.ne.jp" as a domain name portion (step S904). As a result, the recipient terminal 2 outputs the alias address X(R,C) (=suzuki.N12.E030830+ 2W.edqs@alias.isp-A.ne.jp) from the display unit or the like.

As explained in the first embodiment, a domain name of the recipient address R may be included in an alias address and an alias address may be issued by an alias address generating server on a network.

User Address Restoration Processing (Second Embodiment)

Figure 11:
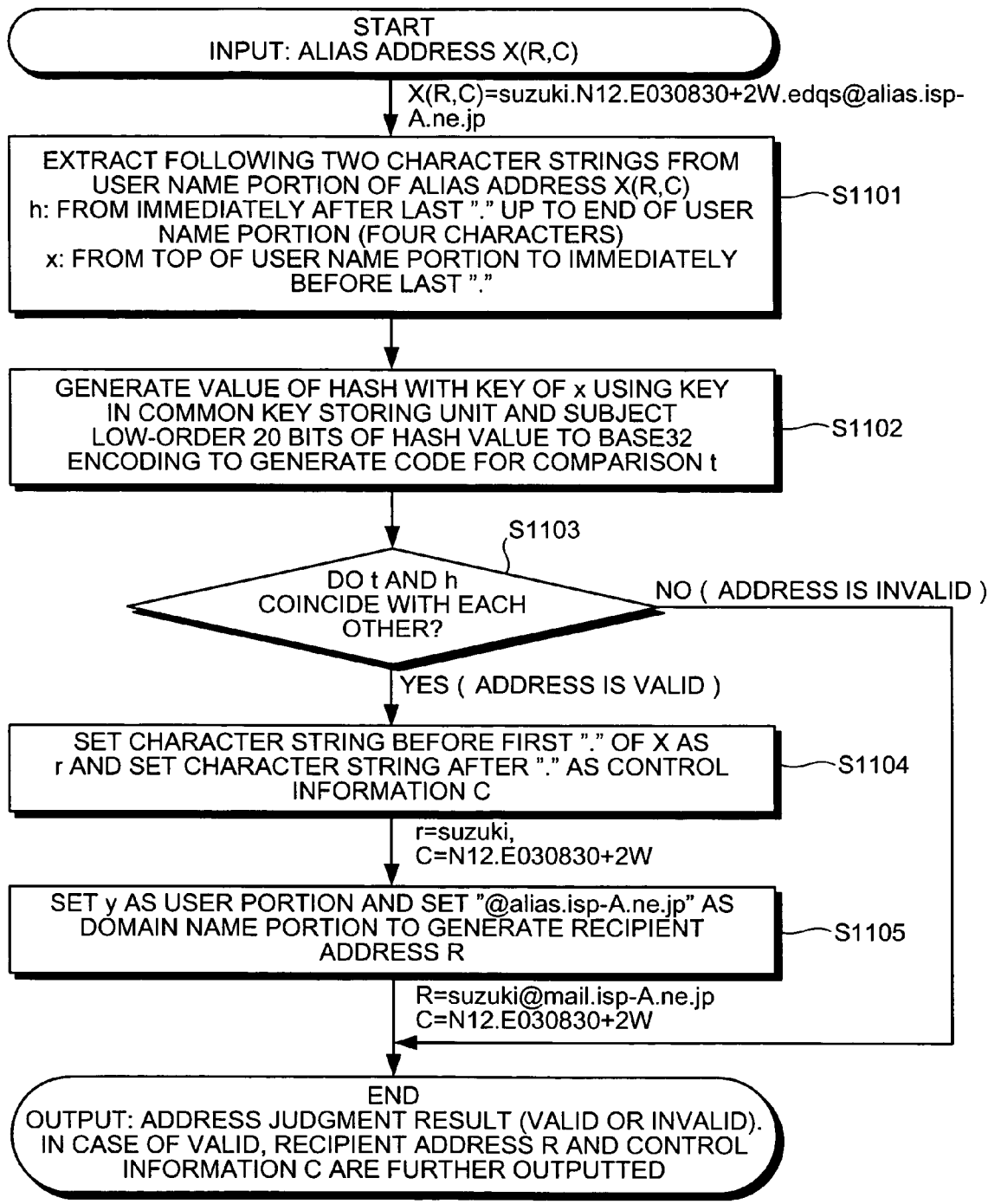
FIG. 11 is a flowchart of a flow of user address restoration processing in the second embodiment.

The user address restoration processing in the second embodiment (step S803 in FIG. 8) is explained with reference to FIG. 11. FIG. 11 is a flowchart of a flow of the user address restoration processing in the second embodiment.

As shown in the figure, when the alias address X(R,C) (=suzuki.N12.E030830+2W.edqs@alias.isp-A.ne.jp), which is the destination of the alias mail, is inputted, in the alias address X(R,C), the user address restoring unit 31 of the alias mail relay server 30 extracts four characters from immediately after the last "." up to the end of the user name portion as the tamper prevention code h (=edqs) and extracts from the top of the user name portion up to immediately before the last "." as the character string x (=suzuki.N12.E030830+2W) (step S1101).

The user address restoring unit 31 generates a hash value of the character string x using the common key of the common key storing unit 34 and subjects low-order 20 bits of the hash value to BASE32 encoding to generate a code for comparison t (=edqs) (step S1102). The user address restoring unit 31 judges whether the tamper prevention code h extracted at step S1101 and the code for comparison t generated at step S1102 coincide with each other (step S1103).

According to the comparison, when both the codes do not coincide with each other ("No" at step S1103), the user address restoring unit 31 considers that the alias address is invalid to end the processing. When both the codes coincide with each other ("Yes" at step S1103), the user address restoring unit 31 considers that the alias address is valid to continue the processing. In other words, the user address restoring unit 31 acquires a character string before "." of the user name portion x (=suzuki.N12.E030830+2W) as r (=suzuki) and acquires a character string after "." as the control information C (=N12.E030830+2W) (step S1104).

The user address restoring unit 31 generates the recipient address R (=suzuki@mail.isp-A.ne.jp) with the character string r (=suzuki) as a user name portion and with "@mail-.isp-A.ne.jp" as a domain name portion (step S1105). As a result, the user address restoring unit 31 outputs the recipient address R (=suzuki@mail.isp-A.ne.jp) and the control information C (=N12.E030830+2W).

Transfer Possibility Judgment Processing (Second Embodiment)

Figure 12:
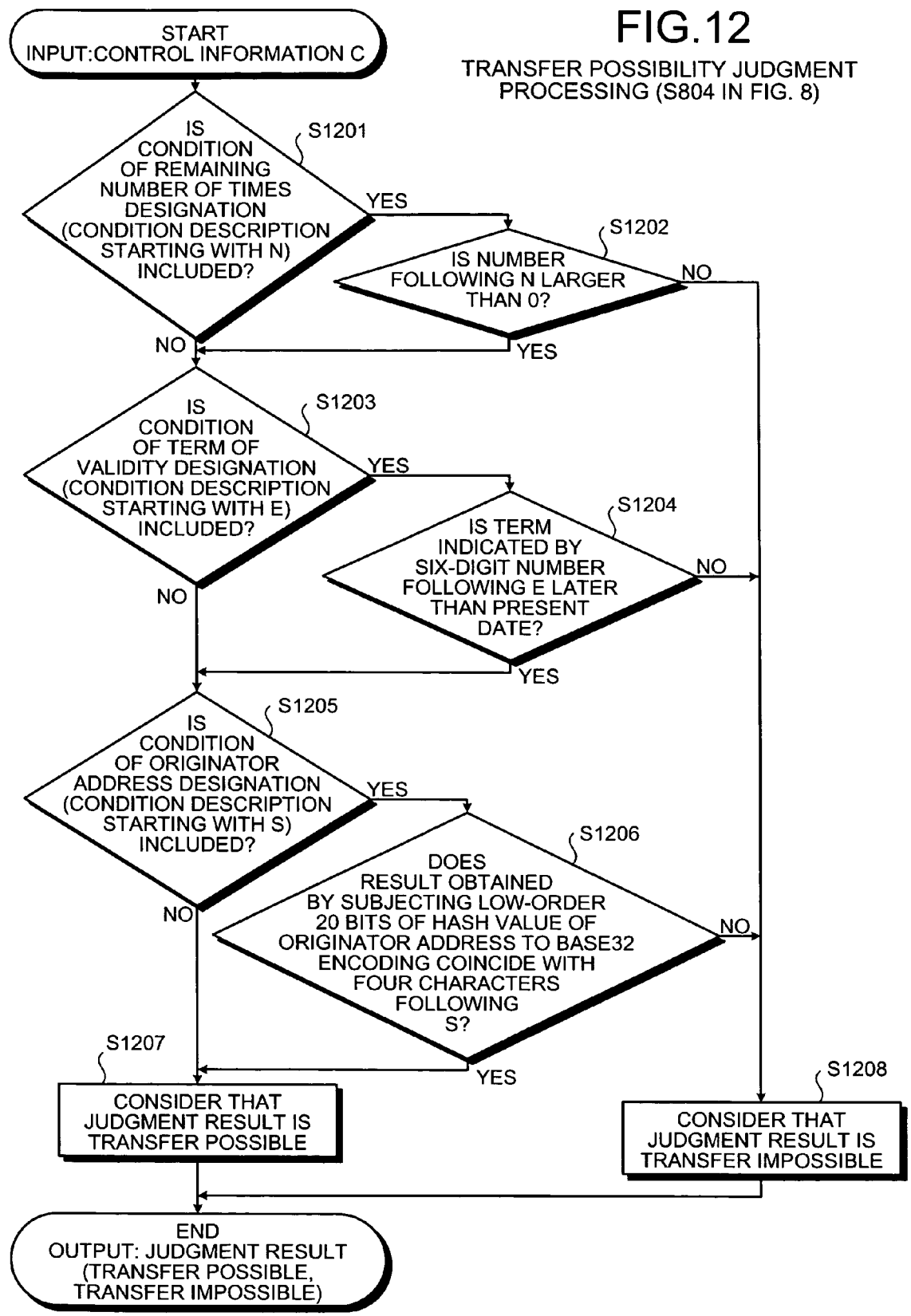
FIG. 12 is a flowchart of a flow of transfer possibility judging processing in the second embodiment.

The transfer possibility judgment processing in the second embodiment (step S804 in FIG. 8) is explained with reference to FIG. 12. FIG. 12 is a flowchart of a flow of the transfer possibility judgment processing in the second embodiment.

As shown in the figure, when the control information C (the transfer conditions such as originator address designation, remaining number of times designation, and term of validity designation) is inputted, first, the transfer possibility judging unit 35 of the alias mail relay server 30 checks whether the condition of the "remaining number of times designation" (the transfer condition identifier "N") is included in the control information C (step S1201). When the condition is included in the control information C ("Yes" at step S1201), the transfer possibility judging unit 35 further judges whether a number following the transfer condition identifier "N" is larger than "0 (zero)" (step S1202).

When the number following the transfer condition identifier "N" is "0 (zero)" ("No" at step S1202), the transfer possibility judging unit 35 considers that a judgment result is "transfer impossible" to end the processing (step S1208). Conversely, when the number following the transfer condition identifier "N" is larger than "0 (zero)" ("Yes" at step S1202) or the condition of the "remaining number of times designation" (the transfer condition identifier "N") is not included in the control information C ("No" at step S1201), the transfer possibility judging unit 35 continues to perform the following judgment.

The transfer possibility judging unit 35 checks whether the condition of the "term of validity designation" (the transfer condition identifier "E") is included in the control information C (step S1203). When the condition is included in the control information C ("Yes" at step S1203), the transfer possibility judging unit 35 further judges whether a term of validity indicated by a six-digit number following the transfer condition identifier "E" is later than a present date and time (step S1204).

In the judgment, when the term of validity indicated by the six-digit number following the transfer condition identifier "E" is not later than the present date and time ("No" at step s1204), the transfer possibility judging unit 35 considers that a judgment result is "transfer impossible" to end the processing (step S1208). Conversely, when the term of validity indicated by the six-digit number following the transfer condition identifier "E" is later than the present date and time ("Yes" at step S1204) or when the condition of the "term of validity designation" (the transfer condition identifier "E") is not included in the control information C ("No" at step S1203), the transfer possibility judging unit 35 continues to perform the following judgment.

The transfer possibility judging unit 35 checks whether the condition of the "originator address designation" (the transfer condition identifier "S") is included in the control information C (step S1205). When the condition is included in the control information C ("Yes" at step S1205), the transfer possibility judging unit 35 further judges whether a value obtained by subjecting low-order 20 bits of a hash value of the originator address S to BASE32 encoding coincides with four characters following the transfer condition identifier "S" (step S1206).

When the value does not coincide with the four characters following the transfer condition identifier "S" ("No" at step S1206), the transfer possibility judging unit 35 considers that a judgment result is "transfer impossible" to end the processing (step S1208). Conversely, when the value coincides with the four characters following the transfer condition identifier "S" ("Yes" at step S1208) or when the condition of the "originator address designation" (the transfer condition identifier "S") is not included in the control information C ("No" at step S1205), the transfer possibility judging unit 35 considers that a judgment result is "transfer possible" to end the processing (step S1207). As a result, the transfer possibility judging unit 35 outputs a judgment result ("transfer possible" or "transfer impossible").

In the above explanation of the transfer possibility judgment processing, the transfer conditions are judged in the order of the remaining number of times designation, the term of validity designation, and the originator address designation. However, it is not always necessary to judge the transfer conditions in this order. The respective transfer conditions may be judged in parallel.

First Control Information Update Processing (Second Embodiment)

Figure 13:
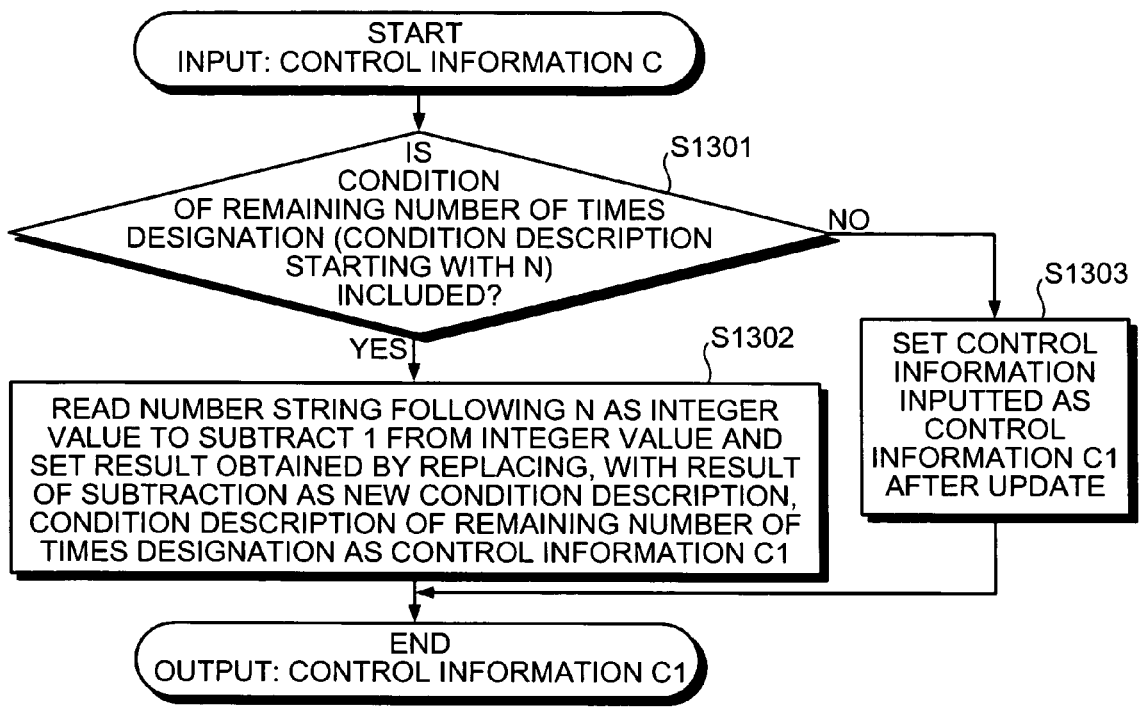
FIG. 13 is a flowchart of a flow of first control information update processing in the second embodiment.

The first control information update processing in the second embodiment (step S805 in FIG. 8) is explained with reference to FIG. 13. FIG. 13 is a flowchart of a flow of the control information update processing in the second embodiment.

As shown in the figure, when the control information C (the transfer conditions such as originator address designation, remaining number of times designation, and term of validity designation) is inputted, first, the control information updating unit 36 of the alias mail relay server 30 checks whether the condition of the "remaining number of times designation" (the transfer condition identifier "N") is included in the control information C (step S1301).

When the condition of the "remaining number of times designation" (the transfer condition identifier "N") is included in the control information C ("Yes" at step S1301), the control information updating unit 36 reads a number string following the transfer condition identifier "N" as an integer value to subtract 1 from the integer value and sets a result obtained by replacing, with a result of the subtraction as a new condition description, a condition description of the remaining number of times designation as the control information C1 after update (step S1302).

Conversely, when the condition of the "remaining number of times designation" (the transfer condition identifier "N") is not included in the control information C ("No" at step S1301), the control information updating unit 36 directly sets the inputted control information C as the control information C1 after update (step S1303). As a result, the control information updating unit 36 outputs the control information C1 after update.

Second Control Information Update Processing (Second Embodiment)

Figure 14:
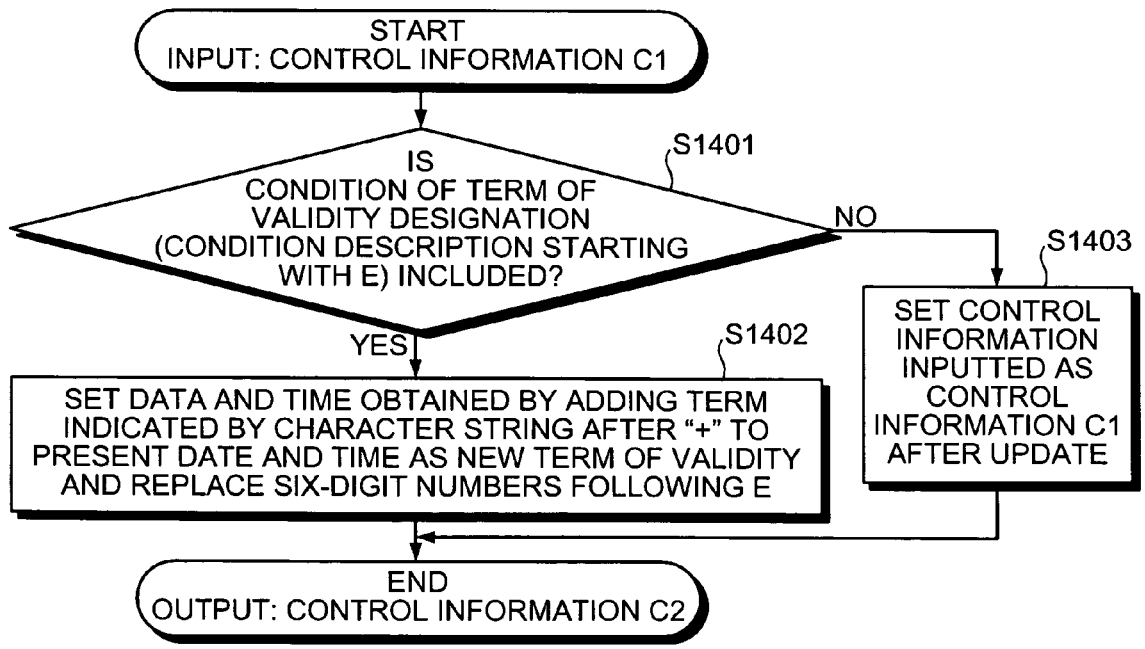
FIG. 14 is a flowchart of a flow of second control information update processing in the second embodiment.

The second control information update processing in the second embodiment (step S812 in FIG. 8) is explained with reference to FIG. 14. FIG. 14 is a flowchart of a flow of the control information update processing in the second embodiment.

As shown in the figure, when the control information C1 (the transfer conditions such as originator address designation, remaining number of times designation, and term of validity designation) is inputted, first, the control information updating unit 45 of the remailer 40 checks whether the condition of the "term of validity designation" (the transfer condition identifier "E") is included in the control information C1 (step S1401).

When the condition of the "term of validity designation" (the transfer condition identifier "E") is included in the control information C ("Yes" at step S1401) the control information updating unit 45 sets a date and time obtained by adding a term indicated by a character string after "+" (e.g., 2W: two weeks) to a present date and time as a new term of validity and replaces six-digit numbers following the transfer condition identifier "E" with the new term of validity to have the control information C2 after update (step S1402).

Conversely, when the condition of the "term of validity designation" (the transfer condition identifier "E") is not included in the control information C ("No" at step S1401), the control information updating unit 45 directly sets the control information C1 inputted as the control information C2 after update (step S1402). As a result, the control information updating unit 45 outputs the control information C2 after update.

In the above explanation, the second control information update processing is executed by the remailer 40. However, it is not always necessary to execute the second control information update processing in the remailer 40. For example, the second control information update processing may be executed in the alias mail relay server 30 together with the first control information update processing.

Effects and the Like of the Second Embodiment

As described above, according to the second embodiment, since transfer possibility judgment is performed according to the control information C restored from the alias address, it is possible to realize exclusion of a spam mail to a recipient. Moreover, since a database (a DB defining transfer conditions) is not used in transfer possibility judgment, it is also possible to increase speed of exclusion processing for a spam mail without causing a burden of management of a database.

According to the second embodiment, since transfer conditions are updated according to the number of times of transfer, a transfer time (or the number of times of reply, a reply time), and the like, it is unnecessary to generate alias addresses many times. It is also possible to exclude a spam mail using an alias address generated once for a medium to long term.

Third Embodiment

In the explanations in the first and the second embodiments, only the recipient receives the issuance of an alias address. However, the embodiments are not always limited to this. It is also possible to apply the embodiments in the same manner when the originator also receives the issuance of an alias address. Moreover, it is also possible to perform transfer possibility judgment for each of the recipient and the originator.

Thus, in the following explanation, as a third embodiment, both the originator and the recipient are users of alias addresses and both the originator and the recipient include the alias addresses in transfer conditions (contexts). The third embodiment is explained in comparison with the second embodiment.

Figure 15:
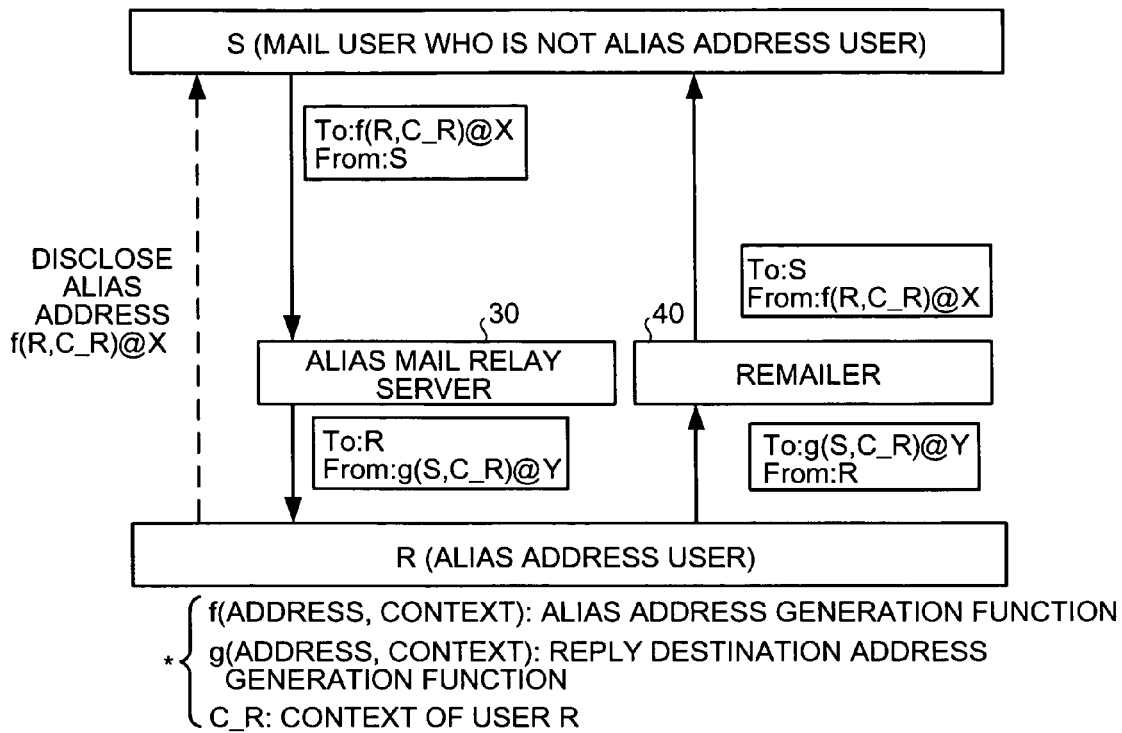
FIG. 15 is a diagram for explaining an outline of the second embodiment.
Figure 16:
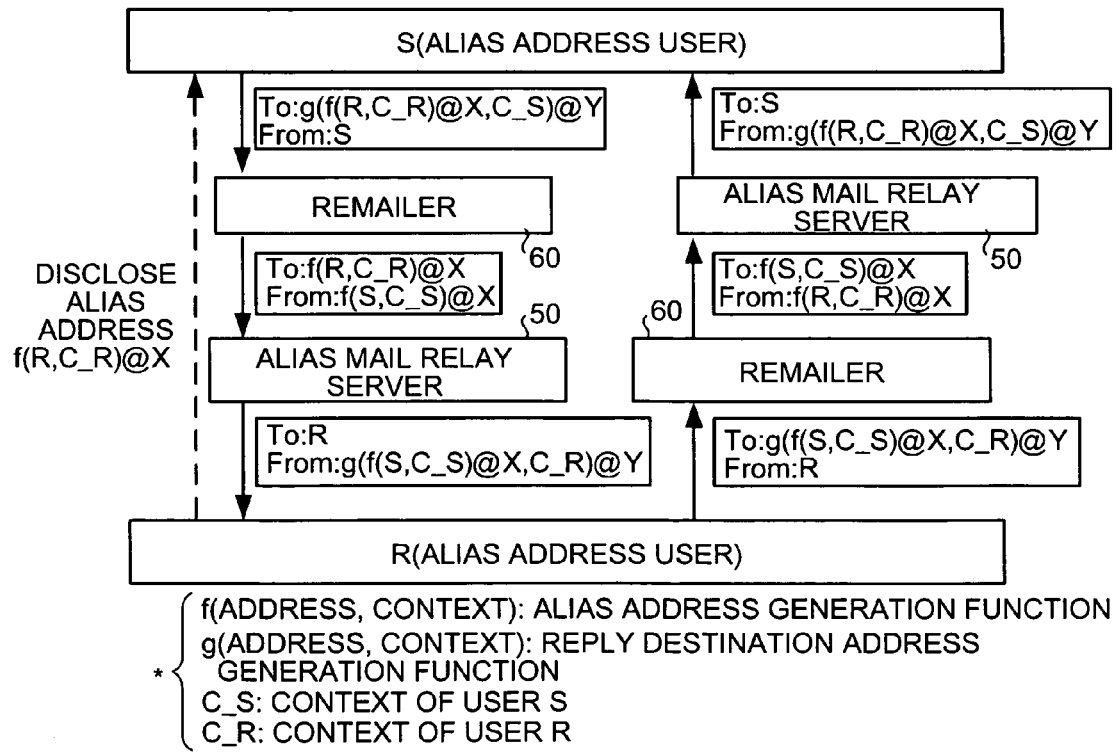
FIG. 16 is a diagram for explaining an outline of the third embodiment.

FIG. 15 is a diagram for explaining an outline of the second embodiment. FIG. 16 is a diagram for explaining an outline of the third embodiment. As shown in FIG. 15, in the second embodiment, first, the recipient R, who is an alias address user, notifies the originator S, who is not an alias address user, of an alias address "f(R,C_R)@X" of the recipient r}.

Consequently, the originator S sends an alias mail, a destination of which is the alias address "f(R,C_R)@X" and a transmission source of which is the originator address S, to the alias mail relay server 30. The alias mail relay server 30 judges possibility of transfer of the alias mail based on "C_R" included in the alias address, replaces the destination with the recipient address R, and replace the transmission source with a reply destination address "g(S,C_R)@Y" to transfer the alias mail to the recipient R.

Subsequently, the recipient R replies to the alias mail to send a reply mail, a destination of which is the reply destination address "g(S,C_R)@Y" and a transmission source of which is the originator address R, to the remailer 40. The remailer 40 replaces the destination with the originator address S and replaces the transmission source with the alias address "f(R,C_R)@X" to transfer the reply mail to the originator S.

On the other hand, in the third embodiment, as shown in FIG. 16, first, the recipient R, who is an alias address user, notifies the originator S, who is also an alias address user, of the alias address "f(R,C_R)@X" of the recipient R. Subsequently, the originator S generates a reply destination address "g(f(R,C_R)@X,C_S)@Y" from the alias address "f(R,C_R)@X" of the recipient R and a generation argument "C_S" of the alias address of the originator S.

The originator S transmits an alias mail, a destination of which is the reply destination address "g(f(R,C_R)@X,C_S)@Y" and a transmission source of which is the originator address S, to a remailer 60. The remailer 60 replaces the destination with the alias address "f(R,C_R)@X" of the recipient R and replaces the transmission source with the alias address "f(S,C_S)@X" of the originator S to transfer the alias mail to the alias mail relay server 50. Moreover, the alias mail relay server 50 judges possibility of transfer of the alias mail based on "C_R" included in the alias address of the recipient R, replaces the destination with the recipient address R, and replaces the transmission source with a reply destination address "g(f(S,C_R)@X,C_S)@Y" to transfer the alias mail to the recipient R.

Subsequently, the recipient R replies to the alias mail to send a reply mail, a destination of which is the reply destination address "g(f(S,C_S)@X,C_R)@Y" and a transmission source of which is the originator address R, to the remailer 60. The remailer 60 replaces the destination with the alias address "f(S,C_S)@X" of the originator S and replaces the transmission source with the alias address "f(R,C_R)@X" of the recipient R to transfer the reply mail to the alias mail relay server 50. Moreover, the alias mail relay server 50 judges possibility of transfer of the alias mail based on "C_S" included in the alias address of the originator S, replaces the destination with the originator address S, and replaces the transmission source with the reply destination address "g(f(R,C_R)@X,C_S)@Y" to transfer the reply mail to the originator S.

Consequently, according to the third embodiment, even when both the originator S and the recipient R use alias addresses, in processing for replacing a transmission source of a mail having an actual address of the originator S or the recipient R as the transmission source with the alias address to transfer the mail, it is possible to realize a reduction in a burden of management of a database, an increase in speed of replacement processing, application of the transfer processing to a user having a plurality of alias addresses, and the like as in the first and the second embodiments.

According to the third embodiment, it is possible to exclude spam mails to both the users (the recipient and the originator). Moreover, since a database (a DB defining transfer conditions) is not used in transfer possibility judgment, it is also possible to increase speed of processing for excluding spam mails to both the users without causing a burden of management of a database.

Fourth Embodiment

The embodiments of the present invention have been explained. However, the present invention may be carried out in various different forms within a scope of the technical ideal described in the patent claims other than the embodiments described above. Thus, various different embodiments are explained as a fourth embodiment.

For example, in the explanations of the embodiments described above, the present invention is applied to a general electronic mail. However, the present invention is not limited to this. For example, it is possible to apply the present invention to instant message communication, IP telephone communication, and the like in the same manner as long as communication using the same addresses as the electronic mail is performed.

In the explanations of the embodiments, the alias address generation argument C is embedded in a transmission source (a From section of header information) of an alias mail. The present invention is not limited to this. It is possible to apply the present invention when the alias address generation argument C is embedded in a part other than the transmission source of the alias mail as long as the alias address generation argument C is embedded in the alias mail to make it possible to restore the alias address generation argument C from the reply mail.

It is also possible to manually perform all or a part of the processing explained as being automatically performed among the respective kinds of processing explained in the embodiments. Alternatively, it is also possible to automatically perform, in the publicly-known method, all or a part of the processing explained as being manually performed. Besides, it is possible to arbitrarily change the processing procedures, the control procedures, the specific names, the information including various data and parameters (in particular, information on an alias address generation argument) described and shown in the document and the drawings unless specifically noted otherwise.

The respective components of the apparatuses (the alias mail relay server, the remailer, and the like) shown in the figures are functionally conceptual and are not always required to be physically constituted as shown in the figure. In other words, specific forms of distribution and integration of the respective apparatuses are not limited to those shown in the figures. It is possible to constitute all or a part of the apparatuses to be functionally or physically distributed and integrated by an arbitrary unit according to various loads, states of use, and the like. For example, the functions of the alias mail relay server and the remailer are realized by an identical apparatus. Moreover, all or a part of the various processing functions performed in the respective apparatuses can be realized by a CPU and programs analyzed and executed by the CPU or can be realized as hardware according to the wired logic.

In the embodiments described above, the respective apparatuses (the alias mail relay server, the remailer, etc.) realizing the present invention are explained in terms of functions. It is also possible to realize the respective functions of the respective apparatuses by causing a computer such as a personal computer or a workstation to execute programs. In other words, it is possible to realize the various processing procedures explained in the embodiments by causing the computer to execute programs prepared in advance. It is possible to distribute these programs through a network such as the Internet. Moreover, these programs are recorded in a computer-readable recording medium such as a hard disk, a flexible disk (FD), a CD-ROM, an MO, or a DVD. It is also possible to execute the programs by reading out the programs from the recording medium with the computer. In other words, for example, it is also possible that CD-ROMs (which may be an individual CD-ROM for each of the apparatuses) having stored therein a program for the alias mail relay server 10 and a program for the remailer 20 described in the first embodiment are distributed and respective computers read out and execute the programs stored in the CD-ROMs.

INDUSTRIAL APPLICABILITY

As described above, the mail delivery system, the mail delivery method, and the mail delivery program according to the present invention are useful in replacing a destination of an alias mail with a recipient address to transfer the alias mail and replacing a transmission source of a reply mail with an alias address to transfer the reply mail. In particular, the mail delivery system, the mail delivery method, and the mail delivery program are suitable for realizing, in transfer processing in the latter case, a reduction in a burden of management of a database, an increase in speed of replacement processing, application of the transfer processing to a user having a plurality of alias addresses, and the like.

The invention claimed is:
1. A mail delivery system comprising:
an alias mail processing unit that receives an alias mail addressed from an originator address to an alias address generated from a recipient address and a predetermined generation argument, restores the recipient address and the generation argument from the alias address, replaces the alias address in the alias mail with the restored recipient address, and replaces the originator address in the alias mail with a reply destination address generated from the restored generation argument and the originator address to transfer the alias mail to the recipient address; and
a reply mail processing unit that receives a reply mail addressed from the recipient address to the reply destination address responding to the alias mail transferred by the alias mail processing unit, acquires the originator address and the generation argument from the reply destination address, regenerates the alias address from the acquired generation argument and the recipient address, replaces the reply destination address in the reply mail with the acquired originator address, and replaces the recipient address in the reply mail with the regenerated alias address regenerated to transfer the reply mail to the originator address.

2. The mail delivery system according to claim 1, wherein the alias mail processing unit includes:
a recipient address restoring unit that restores, when the alias mail is received, the recipient address and the generation argument from the alias address;
a reply destination address generating unit that generates the reply destination address including the generation argument restored by the recipient address restoring unit and the originator address indicating a transmission source of the alias mail; and
an alias mail transfer unit that replaces the destination of the alias mail with the recipient address restored by the recipient address restoring unit and replaces the transmission source of the alias mail with the reply destination address generated by the reply destination address generating unit to transfer the alias mail, and
the reply mail processing unit includes:
an originator address restoring unit that restores, when the reply mail is received, the originator address and the generation argument from the reply destination address that is a destination of the reply mail;
an alias address regenerating unit that regenerates the alias address from the generation argument restored by the originator address restoring unit and the recipient address indicating the transmission source of the reply mail; and
a reply mail transfer unit that replaces the destination of the reply mail with the originator address restored by the originator address restoring unit and replaces the transmission source of the reply mail with the alias address regenerated by the alias address regenerating unit to transfer the reply mail.

3. The mail delivery system according to claim 2, wherein the generation argument is information indicating transfer conditions that the alias mail transferred to the recipient should satisfy,
the alias mail processing unit further includes a transfer possibility judging unit that judges whether the alias mail satisfies transfer conditions restored by the recipient address restoring unit, and
the alias mail transfer unit transfers only an alias mail that is judged by the transfer possibility judging unit as satisfying the transfer conditions.

4. The mail delivery system according to claim 3, wherein the transfer conditions are transfer conditions that can be updated according to transfer of the alias mail,
the alias mail processing unit further includes a transfer conditions updating unit that updates, when it is judged by the transfer possibility judging unit that the transfer conditions are satisfied, the transfer conditions to generate the generation argument anew, and
the reply destination address generating unit generates a reply destination address including the generation argument generated anew by the transfer conditions updating unit instead of the generation argument restored by the recipient address restoring unit.

5. The mail delivery system according to claim 3, wherein the transfer conditions are transfer conditions that can be updated according to reception of the alias mail,
the reply mail processing unit further includes a transfer conditions updating unit that updates the transfer conditions restored by the originator address restoring unit to generate the generation argument anew, and
the alias address regenerating unit regenerates an alias address including the generation argument generated anew by the transfer condition updating unit instead of the generation argument restored by the originator address restoring unit.

6. A mail transfer system that transfers a mail using a recipient alias address generated from a recipient address and a predetermined recipient generation argument and an originator alias address generated from an originator address and a predetermined originator generation argument, the mail transfer system comprising:
a first mail processing unit that receives a mail addressed from the originator address to a recipient reply destination address generated from the recipient alias address and the originator generation argument, restores the recipient alias address and the originator generation argument from the recipient reply destination address, regenerates the originator alias address from the restored originator generation argument and the originator address, and replaces the recipient reply destination address in the mail with the recipient alias address and the originator address in the mail with the regenerated originator alias address to transfer the mail;
a second mail processing unit that receives the mail addressed from the originator alias address to the recipient alias address, restores the recipient address and the recipient generation argument from the recipient alias address, generates an originator reply destination address from the restored recipient generation argument and the originator alias address, and replaces the recipient alias address in the mail with the recipient address and the originator alias address in the mail with the generated originator reply destination address to transfer the mail to the recipient address;
a third mail processing unit that receives a reply mail addressed from the recipient address to the originator reply destination address, restores the originator alias address and the recipient generation argument from the originator reply destination address, regenerates the recipient alias address from the restored recipient generation argument and the recipient address, and replaces the originator reply destination address with the originator alias address and the recipient address in the reply mail with the recipient alias address to transfer the mail; and
a fourth mail processing unit that receives a reply mail addressed from the recipient alias address to the originator alias address, restores the originator address and the originator generation argument from the originator alias address, generates the recipient reply destination address from the restored originator generation argument and the recipient alias address, and replaces the originator alias address in the reply mail with the originator address and the recipient alias address in the reply mail with the recipient reply destination address to transfer the mail to the originator address.

7. The mail transfer system according to claim 6, wherein
the recipient generation argument is information indicating transfer conditions that the mail transferred to the recipient should satisfy and the originator generation argument is information indicating transfer conditions that the mail transferred to the originator should satisfy,
the second mail processing unit judges whether the mails satisfy transfer conditions related to the recipient generation argument restored from the recipient alias address and transfers only a mail that satisfies the transfer conditions, and
the fourth mail processing unit judges whether the mails satisfy transfer conditions related to the originator generation argument restored from the originator alias address and transfers only a mail that satisfies the transfer conditions.

8. A mail delivering method comprising:
alias mail processing implemented by one or more mail processing units including:
receiving an alias mail addressed from an originator address to an alias address generated from a recipient address and a predetermined generation argument,
restoring the recipient address and the generation argument from the alias address, and replacing the alias address in the alias mail with the restored recipient address, and
the originator address in the alias mail with a reply destination address generated from the restored generation argument and the originator address to transfer to alias mail to the recipient address; and
reply mail processing implemented by one or more mail processing units including:
receiving a reply mail addressed from the recipient address to the reply destination address responding to the alias mail transferred,
acquiring the originator address and the generation argument from the reply destination address in the reply mail,
regenerating the alias address from the acquired generation argument and the recipient address in the reply mail, and
replacing the reply destination address in the reply mail with the acquired originator address, and the recipient address in the reply mail with the regenerated alias address to transfer the reply mail to the originator address.

9. The mail delivering method according to claim 8, wherein
the generation argument is information indicating transfer conditions that the alias mail transferred to the recipient should satisfy,
the processing of the alias mail further includes a transfer possibility judging unit that judges whether the alias mail satisfies transfer conditions restored by the recipient address restoring step, and
the transferring of the alias mail transfers only an alias mail that is judged by the transfer possibility judging step as satisfying the transfer conditions.

10. A mail transferring method for transferring a mail using a recipient alias address generated from a recipient address and a predetermined recipient generation argument and an originator alias address generated from an originator address and a predetermined originator generation argument, the mail transfer method comprising:
first mail processing implemented by one or more mail processing units including:
receiving a mail addressed from the originator address to a recipient reply destination address generated from the recipient alias address and the originator generation argument,
restoring the recipient alias address and the originator generation argument from the recipient reply destination address,
regenerating the originator alias address from the restored originator generation argument and the originator address, and
replacing the recipient reply destination address in of the mail with the recipient alias address and the originator address in the mail with the regenerated originator alias address to transfer the mail;

second mail processing implemented by one or more mail processing units including:
  receiving a mail addressed from the originator alias address to the recipient alias address,
  restoring the recipient address and the recipient generation argument from the recipient alias address,
  generating an originator reply destination address from the restored recipient generation argument and the originator alias address, and
  replacing the recipient alias address in the mail with the recipient address and the originator alias address in the mail with the generated originator reply destination address to transfer the mail to the recipient address;
third mail processing implemented by one or more mail processing units including:
  receiving a reply mail addressed from the recipient address to the originator reply destination address,
  restoring the originator alias address and the recipient generation argument from the originator reply destination address,
  regenerating the recipient alias address from the restored recipient generation argument and the recipient address, and
  replacing the originator reply destination address with the originator alias address and the recipient address in the reply mail with the recipient alias address to transfer the mail; and
fourth mail processing implemented by one or more mail processing units including:
  receiving a reply mail addressed from the recipient alias address to the originator alias address,
  restoring the originator address and the originator generation argument from the originator alias address,
  generating the recipient reply destination address from the restored originator generation argument and the recipient alias address, and
  replacing the originator alias address in the reply mail with the originator address and the recipient alias address in the reply mail with the recipient reply destination address to transfer the reply mail to the originator address.

11. The mail transferring method according to claim 10, wherein
  the recipient generation argument is information indicating transfer conditions that the mail transferred to the recipient should satisfy and the originator generation argument is information indicating transfer conditions that the mail transferred to the originator should satisfy,
  the processing of the second mail judges whether the mails satisfy transfer conditions related to the recipient generation argument restored from the recipient alias address and transfers only a mail that satisfies the transfer conditions, and
  the processing of the fourth mail judges whether the mails satisfy transfer conditions related to the originator generation argument restored from the originator alias address and transfers only a mail that satisfies the transfer conditions.

12. A computer readable storage medium containing instructions that, when executed by a computer, causes the computer to perform;
alias mail processing including:
  receiving an alias mail addressed from an originator address to an alias address generated from a recipient address and a predetermined generation argument,
  restoring the recipient address and the generation argument from the alias address, and
  replacing the alias address in the alias mail with the restored recipient address, and the originator address in the alias mail with a reply destination address generated from the restored generation argument and the originator address to transfer the alias mail to the recipient address; and
reply mail processing including:
  receiving a reply mail address from the recipient address to the reply destination address responding to the alias mail transferred,
  acquiring the originator address and the generation argument from the reply destination address in the reply mail,
  regenerating the alias address from the acquired generation argument and the recipient address in the reply mail, and
  replacing the reply destination address in the reply mail with the acquired originator address, and the recipient address in the reply mail with the regenerated alias address to transfer the reply mail to the originator address.

13. The computer readable storage medium according to claim 12, wherein
  the generation argument is information indicating transfer conditions that the alias mail transferred to the recipient should satisfy,
  the alias mail processing procedure further includes a transfer possibility judging unit that judges whether the alias mail satisfies transfer conditions restored by the recipient address restoring unit, and
  the alias mail transferring procedure transfers only an alias mail that is judged by the transfer possibility judging unit as satisfying the transfer conditions.

14. A computer readable storage medium containing instructions that, when executed by a computer, causes the computer to perform:
  a first mail processing including:
    receiving a mail addressed from an originator address to a recipient reply destination address generated from a recipient alias address and a originator generation argument,
    restoring the recipient alias address and the originator generation argument from the recipient reply destination address,
    regenerating an originator alias address from the restored originator generation argument and the originator address, and
    replacing the recipient reply destination address in the mail with the recipient alias address and the originator address in the mail with the regenerated originator alias address to transfer the mail;
  second mail processing including:
    receiving a mail addressed from the originator alias address to the recipient alias address,
    restoring a recipient address and a recipient generation argument from the recipient alias address,
    generating an originator reply destination address from the restored recipient generation argument and the originator alias address, and
    replacing the recipient alias address in the mail with the recipient address and the originator alias address in the mail with the originator reply destination address generated to transfer the mail to the recipient address;

third mail processing including:
- receiving a reply mail addressed from the recipient address to the originator reply destination address,
- restoring the originator alias address and the recipient generation argument from the originator reply destination address,
- regenerating the recipient alias address from the restored recipient generation argument and the recipient address, and
- replacing the originator reply destination address with the originator alias address and the recipient address in the reply mail with the recipient alias address to transfer the mail; and fourth mail processing including:
- receiving a reply mail addressed from the recipient alias address to the originator alias address,
- restoring the originator address and the originator generation argument from the originator alias address,
- generating the recipient reply destination address from the restored originator generation argument and the recipient alias address, and
- replacing the originator alias address in the reply mail with the originator address and the recipient alias address in the reply mail with the recipient reply destination address to transfer the reply mail to the originator address.

15. The computer readable storage medium according to claim 14, wherein
- the recipient generation argument is information indicating transfer conditions that the mail transferred to the recipient should satisfy and the originator generation argument is information indicating transfer conditions that the mail transferred to the originator should satisfy,
- the second mail processing procedure judges whether the mails satisfy transfer conditions related to the recipient generation argument restored from the recipient alias address and transfers only a mail that satisfies the transfer conditions, and
- the fourth mail processing procedure judges whether the mails satisfy transfer conditions related to the originator generation argument restored from the originator alias address and transfers only a mail that satisfies the transfer conditions.

* * * * *